US012657548B2

(12) United States Patent
Nookala et al.

(10) Patent No.: US 12,657,548 B2
(45) Date of Patent: Jun. 16, 2026

(54) SHARING IN MULTI-TIER NETWORK FOR EQUIPMENT MANAGEMENT

(71) Applicant: SAP SE, Walldorf (DE)

(72) Inventors: Ranjith Kumar Nookala, Bengaluru (IN); Manjima Unni, Bengaluru (IN); Petra Eder, Mannheim (DE); Simone Turrin, Heidelberg (DE); Vindya Rani Basavapatnada, Bengaluru (IN); Koushik Kumar Maity, Bengaluru (IN)

(73) Assignee: SAP SE, Walldorf (DE)

( * ) Notice: Subject to any disclaimer, the term of this patent is extended or adjusted under 35 U.S.C. 154(b) by 364 days.

(21) Appl. No.: 18/324,354

(22) Filed: May 26, 2023

(65) Prior Publication Data

US 2024/0394654 A1     Nov. 28, 2024

(51) Int. Cl.
*G06Q 10/087* (2023.01)

(52) U.S. Cl.
CPC .................................. *G06Q 10/087* (2013.01)

(58) Field of Classification Search
CPC ...... G06F 21/62; G06F 16/11; G06F 21/6218; G06F 21/604; G06F 9/451; G06F 16/9535; G06F 21/6227; G06F 21/6236; G06F 21/6209; G06F 21/6245; G06F 21/602; G06F 21/60; G06F 21/6254; G06F 21/6263; G06F 21/6281; G06F 21/629; G06F 21/64; G06F 21/645; G06Q 10/08; G06Q 10/087; G06Q 10/10; G06Q 50/06; G06Q 10/20; G06Q 10/06; G06Q 10/40; G06Q 40/03; G06Q 40/06; G06Q 20/405
See application file for complete search history.

(56) References Cited

U.S. PATENT DOCUMENTS

| | | | |
|---|---|---|---|
| 9,256,840 B2 | 2/2016 | Said et al. | |
| 9,286,364 B2 | 3/2016 | Kuruganti et al. | |
| 10,558,685 B2 | 2/2020 | Kuruganti et al. | |
| 11,494,410 B2 | 11/2022 | Kuruganti et al. | |
| 2004/0024662 A1* | 2/2004 | Gray ...................... | G06Q 10/10 |
| | | | 705/29 |
| 2011/0078197 A1* | 3/2011 | Zurko ................... | H04L 63/104 |
| | | | 707/783 |

(Continued)

*Primary Examiner* — Florian M Zeender
*Assistant Examiner* — Vanessa Deligi
(74) *Attorney, Agent, or Firm* — Buckley, Maschoff & Talwalkar LLC

(57) ABSTRACT

A computer-implemented method and system including generating a representation of an object associated with an equipment in an equipment management network, the object having an object type and being generated for a first user of the equipment management network; receiving, from the first user, an indication of whether a first other user is authorized to reshare the object via the equipment management network with a second other user of the equipment management network; receiving, from the first other user, an indication to reshare the object with the second other user; determining, based on a value of the indication of whether the first other user is authorized to reshare the object with the second other user, that the first other user is authorized to reshare the object with the second other user; and automatically resharing the object with the second other user without requesting approval from the first user.

20 Claims, 22 Drawing Sheets

(56)  References Cited

U.S. PATENT DOCUMENTS

| | | | |
|---|---|---|---|
| 2015/0379456 A1* | 12/2015 | Aynsley-Hartwell | ........................ G06Q 10/063114 705/7.15 |
| 2019/0087432 A1* | 3/2019 | Sion | .................... G06F 21/6218 |
| 2019/0166193 A1* | 5/2019 | de Luna | .............. H04L 67/1095 |
| 2019/0362075 A1* | 11/2019 | Kríz | ....................... G06F 21/562 |
| 2021/0397726 A1* | 12/2021 | Kulaga | ................. G06F 16/906 |
| 2022/0035933 A1* | 2/2022 | Qiao | .................... G06F 16/168 |
| 2022/0078234 A1* | 3/2022 | Esfahani | ............. H04L 67/1095 |
| 2023/0115475 A1* | 4/2023 | Alsumail | ............... G06N 3/084 700/79 |
| 2024/0070380 A1* | 2/2024 | Walsh | .................... G06F 16/93 |

* cited by examiner

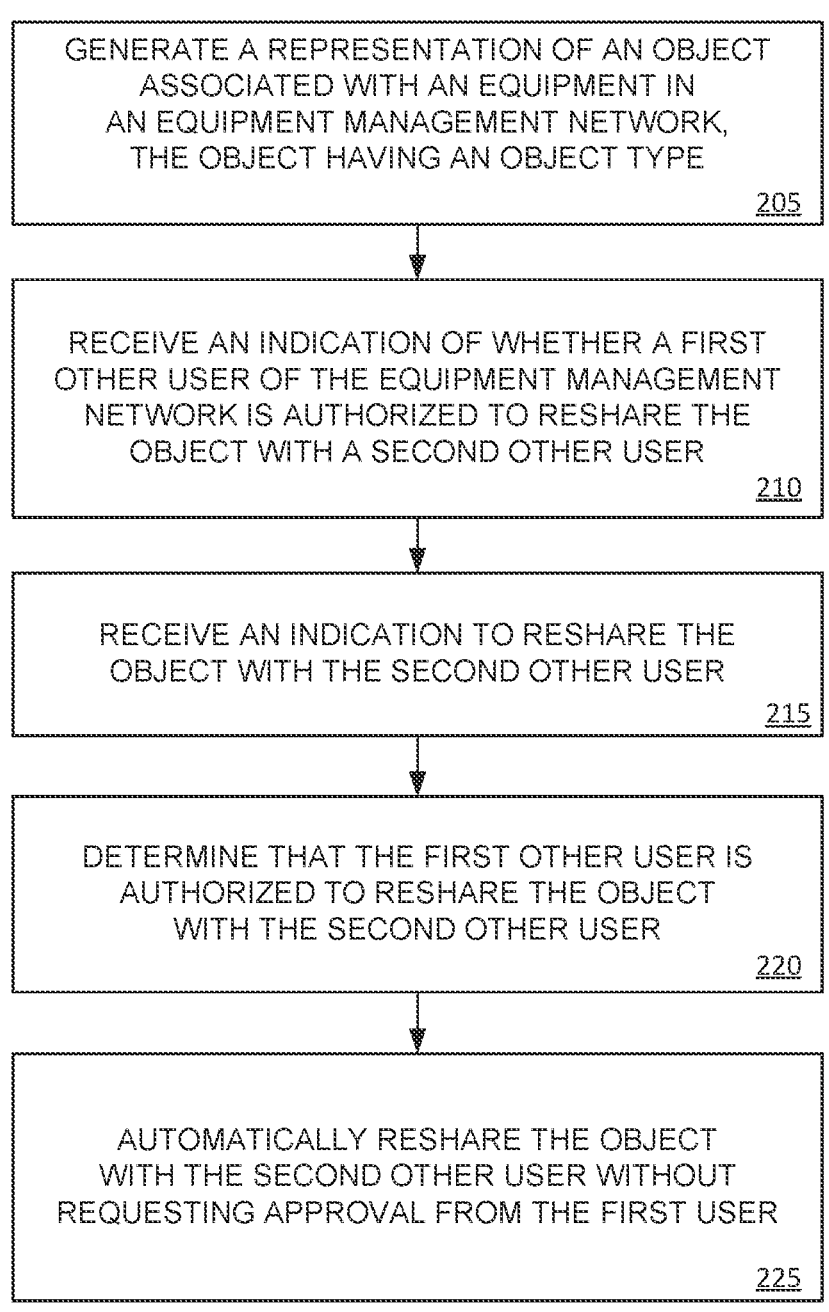

200

GENERATE A REPRESENTATION OF AN OBJECT
ASSOCIATED WITH AN EQUIPMENT IN
AN EQUIPMENT MANAGEMENT NETWORK,
THE OBJECT HAVING AN OBJECT TYPE

205

RECEIVE AN INDICATION OF WHETHER A FIRST
OTHER USER OF THE EQUIPMENT MANAGEMENT
NETWORK IS AUTHORIZED TO RESHARE THE
OBJECT WITH A SECOND OTHER USER

210

RECEIVE AN INDICATION TO RESHARE THE
OBJECT WITH THE SECOND OTHER USER

215

DETERMINE THAT THE FIRST OTHER USER IS
AUTHORIZED TO RESHARE THE OBJECT
WITH THE SECOND OTHER USER

220

AUTOMATICALLY RESHARE THE OBJECT
WITH THE SECOND OTHER USER WITHOUT
REQUESTING APPROVAL FROM THE FIRST USER

| Share with Group | | | | |
| --- | --- | --- | --- | --- |
| | Share | Edit / Unshare | | |
| Group(6) | | | testing | ✕ 🔍 |
| Name | Description | Created On | Changed On | Business Partner Count |
| ◯ Testing | | Feb 8, 2022 | Aug 23, 2022 | 0 |
| ◉ Testing_1 | Testing_1 | Sep 2, 2022 | Sep 2, 2022 | 1 |
| ◯ PerformanceTesting | PerformanceTesting | Mar 4, 2022 | Sep 5, 2022 | 0 |
| ◯ Testing_Circle | Testing_Circle | Sep 7, 2022 | Sep 7, 2022 | 1 |
| ◯ Document_Testing_Group | Document_Testing_Group | Mar 7, 2022 | Sep 29, 2022 | 1 |
| ◯ eu20_operator | Document Testing | Jan 12, 2022 | Dec 2, 2022 | 1 |

Share    Cancel

Share with Group    1200

Groups (77)

Search    🔍

| | Name | Description | Created On | Changed On | Business Partner Count |
|---|---|---|---|---|---|
| ○ | My Invitees | Share business object or business objects with my invitees. | Nov 10, 2021 | Jan 11, 2023 | 9 |
| ○ | Public | Share business object or business objects with everyone on network. | Nov 10, 2021 | Jan 23, 2023 | 33 |
| ◉ | My Connected Partners | Share business object or business objects with my connected partners. | Nov 10, 2021 | Jan 12, 2023 | 11 |
| ○ | Karate02 | Karate02 | Nov 24, 2021 | Nov 24, 2021 | 0 |
| ○ | testtestte | Test Circle for Karate Test Case | Nov 24, 2021 | Nov 24, 2021 | 0 |

1205    1210

Share    Cancel

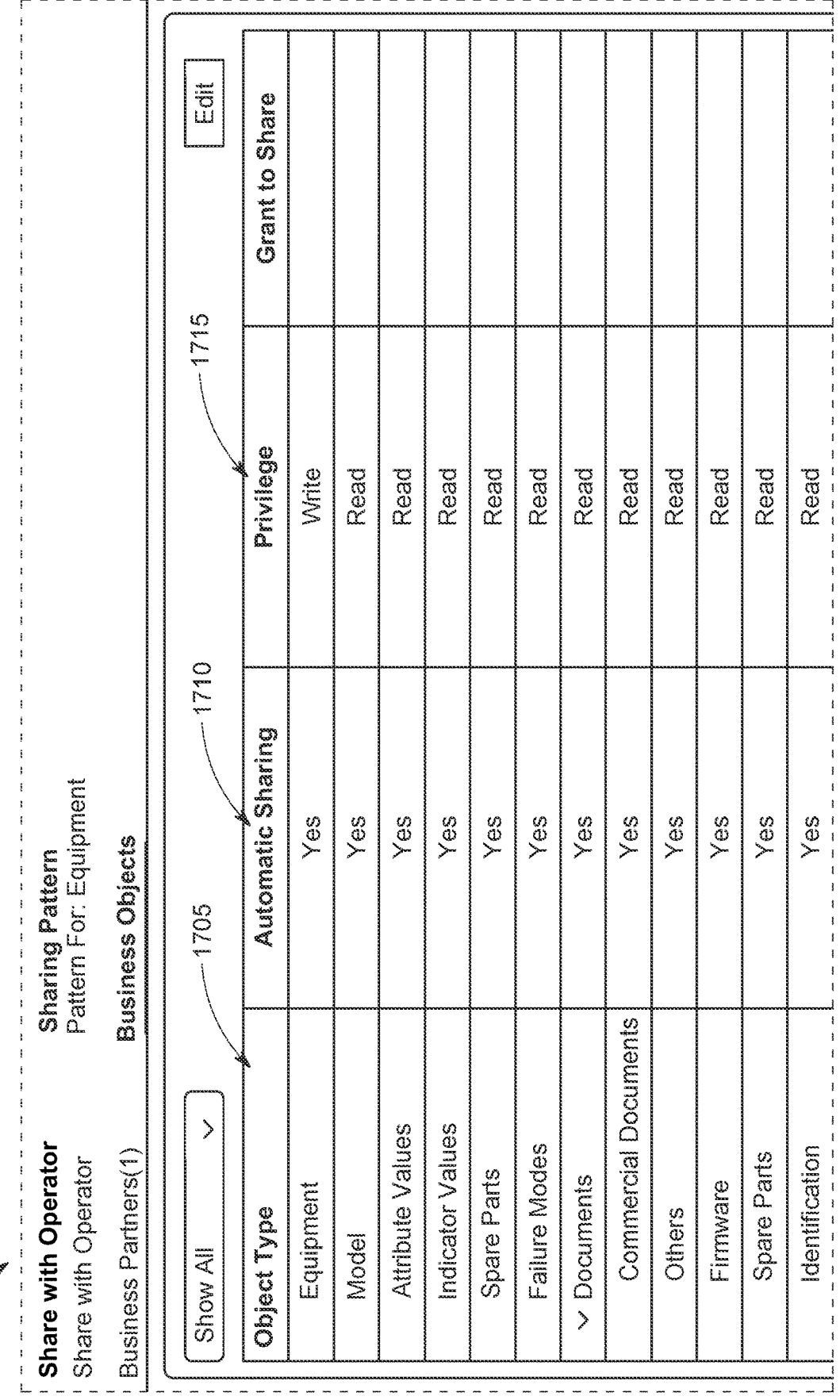

Share with Operator
Share with Operator

Business Partners(1)

Sharing Pattern
Pattern For: Equipment

Business Objects

Edit

| Object Type | Automatic Sharing | Privilege | Grant to Share |
|---|---|---|---|
| Equipment | Yes | Write | |
| Model | Yes | Read | |
| Attribute Values | Yes | Read | |
| Indicator Values | Yes | Read | |
| Spare Parts | Yes | Read | |
| Failure Modes | Yes | Read | |
| ∨ Documents | Yes | Read | |
| Commercial Documents | Yes | Read | |
| Others | Yes | Read | |
| Firmware | Yes | Read | |
| Spare Parts | Yes | Read | |
| Identification | Yes | Read | |

Show All ∨

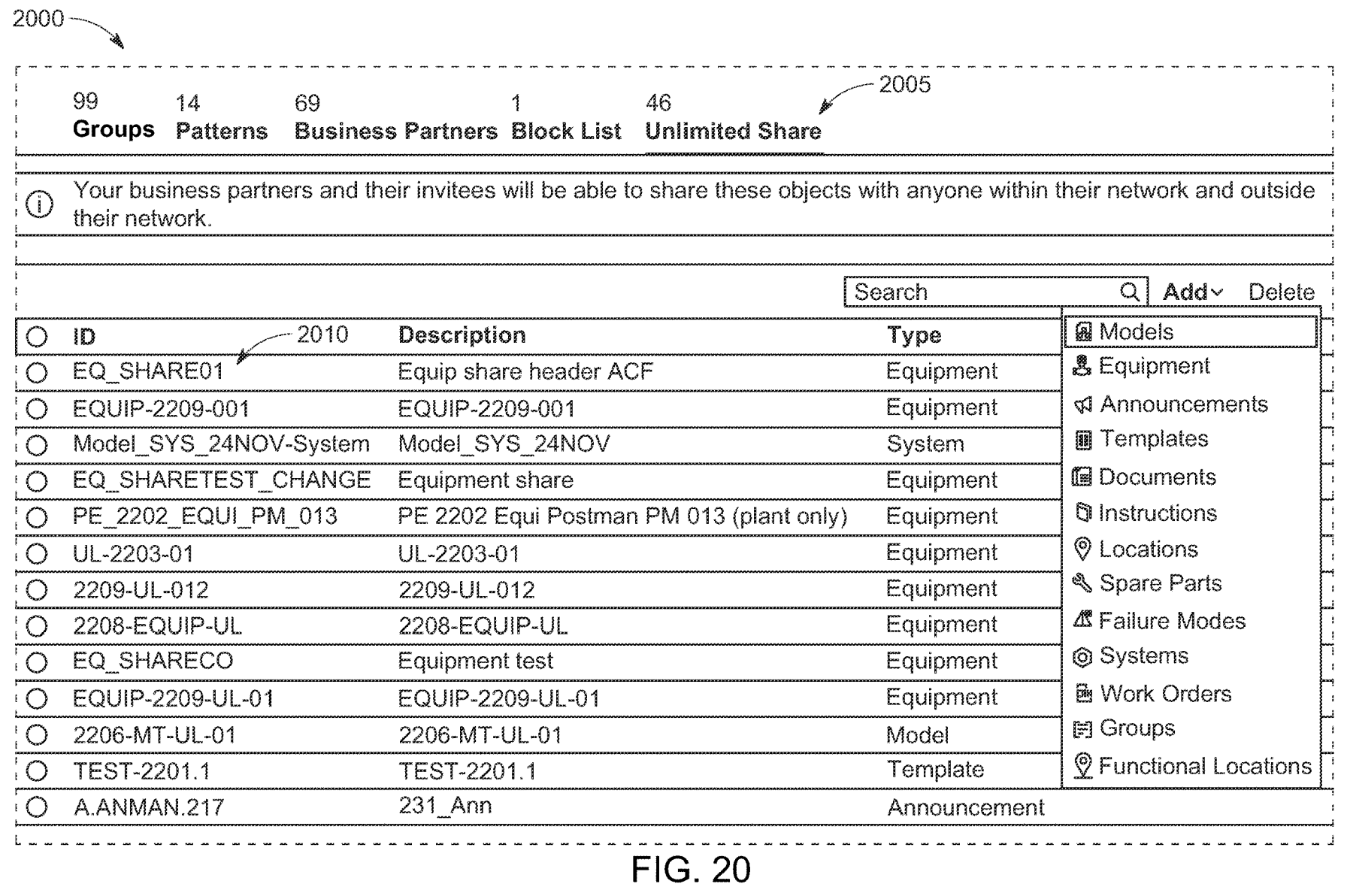

99    14    1    46
Groups    Patterns    Business Partners    Block List    Unlimited Share

2005

ⓘ Your business partners and their invitees will be able to share these objects with anyone within their network and outside their network.

| | ID | Description | Type |
|---|---|---|---|
| ○ | EQ_SHARE01 | Equip share header ACF | Equipment |
| ○ | EQUIP-2209-001 | EQUIP-2209-001 | Equipment |
| ○ | Model_SYS_24NOV-System | Model_SYS_24NOV | System |
| ○ | EQ_SHARETEST_CHANGE | Equipment share | Equipment |
| ○ | PE_2202_EQUI_PM_013 | PE 2202 Equi Postman PM 013 (plant only) | Equipment |
| ○ | UL-2203-01 | UL-2203-01 | Equipment |
| ○ | 2209-UL-012 | 2209-UL-012 | Equipment |
| ○ | 2208-EQUIP-UL | 2208-EQUIP-UL | Equipment |
| ○ | EQ_SHARECO | Equipment test | Equipment |
| ○ | EQUIP-2209-UL-01 | EQUIP-2209-UL-01 | Equipment |
| ○ | 2206-MT-UL-01 | 2206-MT-UL-01 | Model |
| ○ | TEST-2201.1 | TEST-2201.1 | Template |
| ○ | A.ANMAN.217 | 231_Ann | Announcement |

2010

Q | Add ⌄    Delete

Search

▥ Models
⚙ Equipment
✐ Announcements
▦ Templates
▣ Documents
▯ Instructions
◉ Locations
✎ Spare Parts
◢ Failure Modes
◎ Systems
▦ Work Orders
▤ Groups
◇ Functional Locations

FIG. 20

| Object Type | Fields |
|---|---|
| EQUIPMENT | Item Number, Model Number, Manufacture Date, Grant to Share |
| DOCUMENT | Title, Reference ID, Creator Name, Revision Number |

SHARING IN MULTI-TIER NETWORK FOR EQUIPMENT MANAGEMENT

BACKGROUND

Numerous different enterprises or entities might interact with an asset or other equipment throughout the lifecycle, or at least a portion thereof, of the equipment. For example, a manufacturer of the equipment may initially produce the equipment, a plant operator might operate the equipment once it is installed in their plant, and the plant operator may further have the equipment in their plant maintained by one or more outside service providers, where the service providers might use contractors and/or subcontractors to service the equipment. The manufacturer may typically have one or more back-end systems supporting and implementing the processes related to the production of the equipment (e.g., the design specifications, maintenance documentation, maintenance schedules, etc. associated with the equipment). The manufacturer, via their backend system(s), may generate data representative of and associated with the equipment. The plurality of other entities the manufacturer may work with or that might want to interact with the equipment data including, for example, equipment operators, maintenance service providers, subcontractors, etc., may each also have back-end system(s) that support the implementation of their work processes.

In an effort to collaborate with other entities, the manufacturer might want to share the data related to the equipment with one or more other entities. However, securely sharing the equipment data with other entities might place a continuing burden on the manufacturer, where the manufacturer might have to continually initiate the sharing of the equipment related data. The process of secure, responsible sharing of equipment data is not typically provided by equipment management networks.

Accordingly, it would therefore be desirable to provide a framework for multi-tier sharing services and systems to, for example, support and facilitate an efficient collaboration and resharing of data.

BRIEF DESCRIPTION OF THE DRAWINGS

FIG. 2 is an illustrative process flow, according to an example embodiment;

FIG. 7 is an illustrative outward facing user interface for sharing an object, according to an example embodiment.

FIG. 12 is an illustrative outward facing user interface for sharing an object with a group, according to an example embodiment;

FIG. 17 is an illustrative outward facing user interface for specifying resharing rights related to automatic sharing, according to an example embodiment;

FIG. 20 is an illustrative outward facing user interface related to an unlimited share feature, according to an example embodiment;

DETAILED DESCRIPTION

Figure 1:
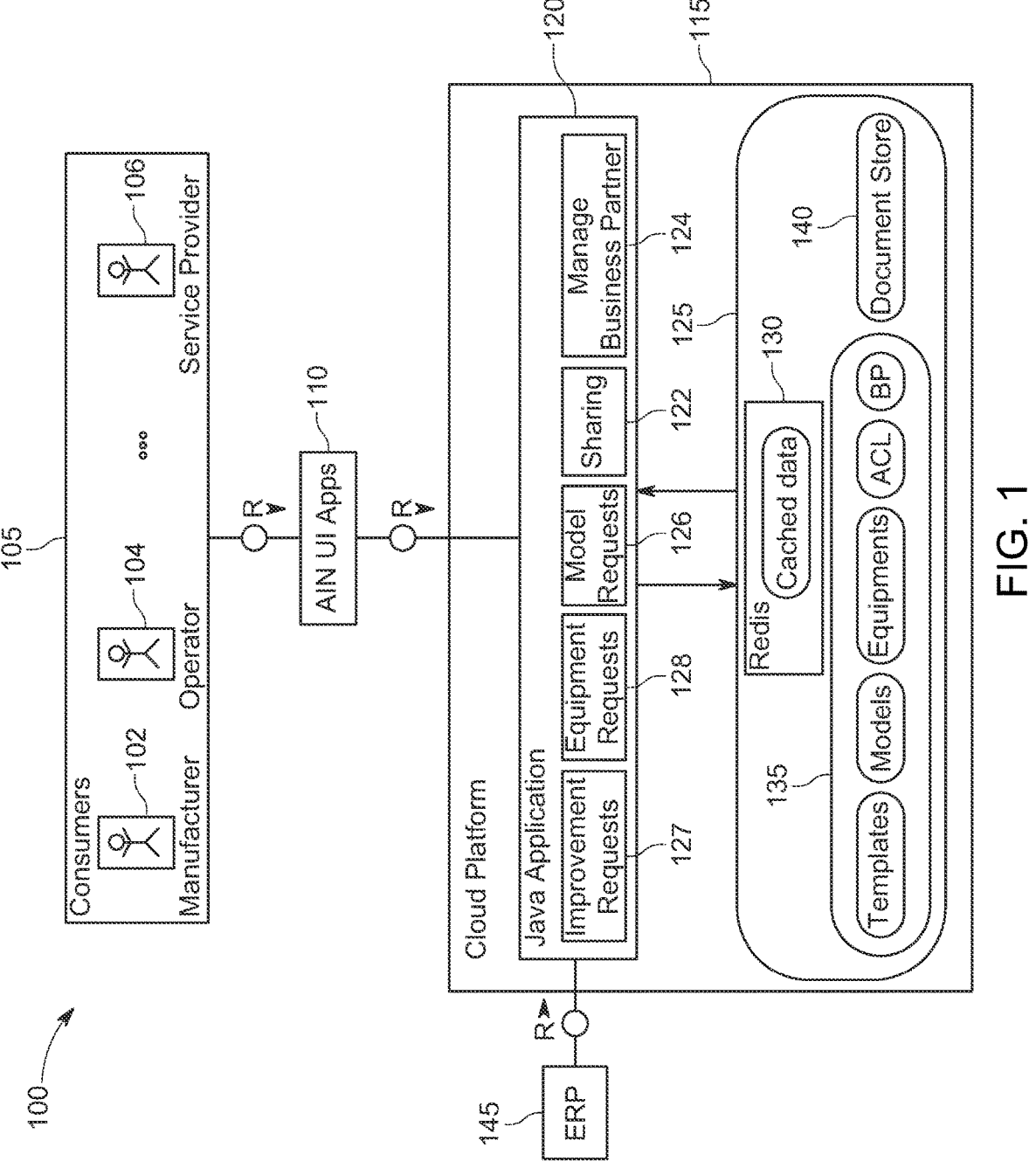
FIG. 1 is an illustrative depiction of a system architecture, according to an example embodiment.

The following description is provided to enable any person in the art to make and use the described embodiments. Various modifications, however, will remain readily apparent to those in the art.

In some aspects of the present disclosure, one embodiment includes a framework or architecture to efficiently and securely share and reshare data related to an object amongst multiple different entities having access to an integrated network or collaboration platform. In some embodiments, the collaboration platform may operate to provide unified visibility and access to data of the objects shared via the collaboration platform. In some aspects, an integrated network or collaboration platform herein may provide, via connected infrastructure, shared storage and access to data related to objects to be shared and otherwise accessed and processed via the collaboration platform.

Various aspects of one or more embodiments of the present disclosure may be illustrated by one or more example systems and processes. The one or more example systems and processes disclosed herein may be discussed with respect to one or more illustrative contexts. For instance, some aspects of the present disclosure will be discussed in the illustrative context of an asset or equipment of an industrial plant, wherein a manufacturer produces the equipment, an operator of an industrial plant operates and manages the maintenance of the different equipment (i.e., assets) of the plant, and service providers may perform services on the equipment at the request and/or direction of the operator to maintain and/or repair the equipment.

In some aspects, all relevant information related to an equipment might be digitized and comprise the entirety of the data managed by an integrated network herein. As used herein, an "object" may refer to any aspect of data related to an equipment. For example, a manufacturer of an industrial asset or piece of equipment may create a digital twin (i.e., data representative of the equipment) corresponding to the real-world embodiment of the equipment. In some embodiments, objects associated with the equipment might include, but are not limited to, digitized models of the equipment (i.e., the digital twin), metadata associated with and descriptive of the equipment, bill of materials for the equipment, design specifications for the equipment, operating instruction manuals for the equipment, maintenance schedules and procedures for the equipment, failure modes for the equipment, etc. A distinction between various objects related to a particular equipment may be indicated by an "object type", where the object type may specify whether the associated "object" is one of a digital twin, bill of materials, design specifications, operating instruction manual(s), maintenance procedure(s), failure modes, or other aspects related to the equipment.

As an illustrative example context where the systems and processes of sharing in a multi-tier network for equipment management disclosed herein may be useful, some aspects regarding the maintenance of the assets of an industrial plant by an operator of the plant will now be discussed. In some instances, in an effort to timely maintain the plant equipment, the plant operator may need to obtain information regarding the plant equipment and its associated documentation from one or more different equipment manufacturers of the plant equipment, as well as engage with one or more outside service providers that can service or otherwise support the maintenance of the plant's assets. The manufacturer may create data representative of the equipment (i.e., various objects) on their on-premise backend system(s) or a cloud platform or service providing such functionality (e.g., an ERP, enterprise resource planning, system). In some instances, an operator of the equipment may typically need to access to at least some of the data (e.g., digital twin model(s), documentation, operating instructions, maintenance procedures, etc.) related to a particular asset that they operate within their plant to maintain and service the equipment.

In some embodiments, the manufacturer may share the data associated with the equipment (i.e., data objects) that they created with an operator (or other entity). The manufacturer may share the data objects with the operator via an equipment management network to which both the manufacturer and the operator have access. In this manner, the operator (or other entity) may receive the data objects from the manufacturer (i.e., the owner of the data objects), assured that the shared objects are authentic since they are shared directly from the manufacturer. Also, the manufacturer has control of with whom the data objects are shared.

Additionally, the operator may typically have one or more back-end systems and networks supporting and implementing the processes (e.g., procurement, plant maintenance, etc.) related to the maintenance of their plant assets and the plurality of service providers may each also have back-end systems and networks that support the implementation of their work processes to provide their services to the operator.

However, one impediment to having the entities (e.g., the operator, manufacturers, and service providers) collaborate and share equipment related data in an efficient and reliable manner has previously been a lack of intelligent sharing between different downstream entities. For example, a plant operator might use one or more different outside service providers to service the equipment deployed in their plant(s). The outside service providers may typically need to access to at least some of the data (e.g., documentation, etc.) related to a particular asset that they are tasked to service, including, for example, the equipment specifications, schematics, manuals, and maintenance procedures from the manufacturers, the equipment's maintenance history, etc. In some instances, the manufacturer might not even have a relationship with the service providers. Moreover, requiring the manufacturers to share the desired, relevant equipment associated data with the various service providers (and/or other downstream entities) may place an undue burden on manufacturers of equipment. While such a requirement may allow the manufacturer to maintain control of which entities their equipment associated data is shared, such a burden might potentially continue throughout the life of the equipment (e.g., years).

FIG. 1 is an illustrative depiction of an overall system architecture 100, according to an example embodiment. Continuing the example of sharing equipment associated data objects, FIG. 1 is an illustrative system architecture 100 that might be utilized to share different data objects (also referred to as objects herein) related to an equipment amongst different entities 105 having access to an equipment management network 115 such that a manufacturer 102 (or another owner of a data object) may efficiently share their data object(s) with other users (e.g., operator 104 and service provider 106) via equipment management network 115. In some aspects, equipment management network 115 provides a mechanism for manufacturer 102 (or another owner of a data object) to share data objects, via the equipment management network, with users of different tiers or levels without requiring further approvals or permissions from the manufacturer (or other owner of the data object). For example, manufacturer 102 (or another owner of a data object) may share their data object(s) with operator 104 with whom they have a relationship or other (e.g., professional, contractual, etc.) connection and further specify whether operator 104 can reshare the data object(s) with service provider 106 (or other downstream entities) without further approval or permissions from the manufacturer.

In some aspects, equipment management network 115 provides visibility to the downstream sharing status of data objects stored, managed, and shared thereby. In some instances, an owner of a data object (e.g., manufacturer 102) accessing a data object shared by the equipment management network may be presented, via a user interface, a view of, for example, all of the entities with whom the data object has been shared via equipment management network, as well as the resharing rights assigned to the data object.

Equipment management network 115 further includes cloud-based collaboration application 120 that includes functionality 124 for managing business partners such as creating connections between different entities and organizing entities into groups, functionality 122 for specifying and managing the access rights (e.g., read access right, write access right) and resharing rights associated with an object, and other functionalities 126, 127, and 128 related to defining, processing, and managing requests related to objects including model requests, equipment requests, and improvement requests, respectively.

Referring still to FIG. 1, a manufacturer might generate or otherwise own data objects related to an asset or equipment in an ERP system 145. The data objects may be transmitted to equipment management network 115 that is configured to, for example, manage and store the data objects in a data storage facility 125. In some embodiments, the data objects may include one or more different types of objects 135, including, but not limited to, equipment, models, templates, etc. In some embodiments, objects having an object type of a "document" (e.g., operating manuals, instructions manuals, assembly manuals, schematics, etc.) might be stored in a document store 140, which may be particularly configured to efficiently store, index, and manage documents (e.g., structured documents, unstructured documents, etc.). In one embodiment, data storage facility 125 may include or integrate a cached data service 130 for storing data in a fast in-memory data store. Data objects managed and stored in data storage device, facility, or service 125 provides shared access to such data with the entities (e.g., the manufacturer, operator, service providers, service provider contractors and subcontractors, etc.) that may provide information to the collaboration service or application 120 or otherwise be provided access privileges to the data thereof.

In some aspects, the data objects owned by the manufacturer (or other creator/owner thereof) and transmitted from ERP system 145 to equipment management network 115, may be consumed or otherwise accessed by users 106. Users 106 may access equipment management network 115 via one or more user interface (UI) applications 110. In some instances, communication between systems and devices of users 105 may be facilitated by an application programming interface (API) call. In some instances, the API may be provided by the equipment management network. In some embodiments, information shared in a newly created or updated data object created in the ERP system 145 may be automatically transmitted to the equipment management network 115 via an API call using an API provided by the equipment management network, in response to the creation or updating of the data object including an indication of whether a first other user of the equipment management network (e.g., an operator 104) is authorized to reshare the object via the equipment management network with a second other user (e.g., service provider 106). The created or updated data object might then be reshared by the first other user in accordance with a resharing value as conveyed by the indication included with the object.

It is noted that the use of the terms a "first" user, "first other user", and a "second other user" herein is only meant to distinguish the various different users from each other, as opposed to any other significance, meaning, or priority.

Accordingly, in some aspects, an equipment management network disclosed herein might provide a mechanism for a data object owner to share data objects with other users and specify whether the other users may reshare the data objects with certain other further users in an efficient and controlled secure manner, without requiring the owner of the data object to grant additional approval or permissions to the other users of the equipment management network.

FIG. 2 is an illustrative process flow 200 related to an example embodiment. In particular, process 200 relates to a specification of a right to reshare a data object that might be processed by a collaboration application or service (e.g., FIG. 1, 120) of an equipment management network herein. At operation 205, a representation of an object (i.e., a data object) associated with an equipment may be generated. In some embodiments, the data object might be created in a backend ERP system operated by a manufacturer (or other entity). In some embodiments, the data object might be created in equipment management network 115 including the functionalities of a collaboration application or service herein. Whether created in ERP system 145 or in equipment management network 115, the data object is generated for an owner or creator of the data object. In some instances herein, including the present example, the creator or owner of the data object may be referred to as a first user of the equipment management network. In some aspects, the generated data object includes the characteristic or property of an object type, where the object type might indicated one or more features of the particular object. For example, an object type in some instances herein might include an equipment, a model, a document, a template, etc.

At operation 210, an indication of whether a first other user of the equipment management network (e.g., an operator) is authorized to reshare the object via the equipment management network with a second other user of the equipment management network (e.g., an outside service provider contracted to provided services on behalf of the operator) may be received from the first user (e.g., the manufacturer of the equipment related to the data object). In some embodiments, a specific value in a defined data field of the representation of the data object (e.g., a data structure) may indicate whether the first other user of the equipment management network is authorized to reshare the data object via the equipment management network with a second other user. In some instances, the value might be implemented as an encoded character or string of characters, numbers, data flag, indicia, or the like. In some instances, the absence of a particular value might be interpreted as an indication that the first other user of the equipment management network is or is not authorized to reshare the data object via the equipment management network with a second other user.

Continuing to operation 215, an indication to reshare the object with the second other user (e.g., the outside service provider) via the equipment management network might be received by the equipment management network from the first other user (e.g., the operator of the equipment). That is, the equipment management network might receive an indication that the operator (e.g., FIG. 1, 104) wants to the further share (i.e., reshare) the data object previously shared with them with the outside service provider (e.g., FIG. 1, 106) having a relationship with the operator (and not necessarily any relationship with the manufacturer).

At operation 220, a determination is made that the first other user is authorized to reshare the object with the second other user. In some aspects, the determination is performed based on a value included in the indication of whether the first other user is authorized to reshare the object with the second other user. In some instances, the indication will include a specific, predefined value to indicate the first other user is authorized to reshare the object with the second other user (i.e., do not grant right to reshare if the specific value is not present in the indication). In some other instances, the absence of a specific, predefined value in the indication may operate to indicate the first other user is authorized to reshare the object with the second other user (i.e., proceed to grant right to reshare if the specific, predefined value is not present in the indication). Other schemes for indicating whether a data object may be reshared by a user of an equipment management network herein may be implemented within the scope of the present disclosure.

In some embodiments, a role of a user might also be a basis for whether the user is permitted or authorized to (re)share a data object with other users. For example, one particular operator might not be permitted to, due to their role as, for example, a "new" operator, reshare data objects shared with them. Conversely, another operator might be permitted to, due to their role as, for example, a "favored" operator, reshare data objects shared with them. In some embodiments, a combination of a user's role and the indication of whether the first other user is authorized to reshare the object with the second other user assigned to a data object may be used to determine whether a particular user can reshare the data object with other users.

At operation 225, the equipment management network may operate to automatically reshare the data object with the second other user (e.g., the outside service provider) without requesting approval from the first user. That is, based on the resharing right indication associated with the data object, the data object can be automatically reshared from the operator to the outside service provider, without a need to receive further approval, permission, or other input from the manufacturer.

Figure 3:
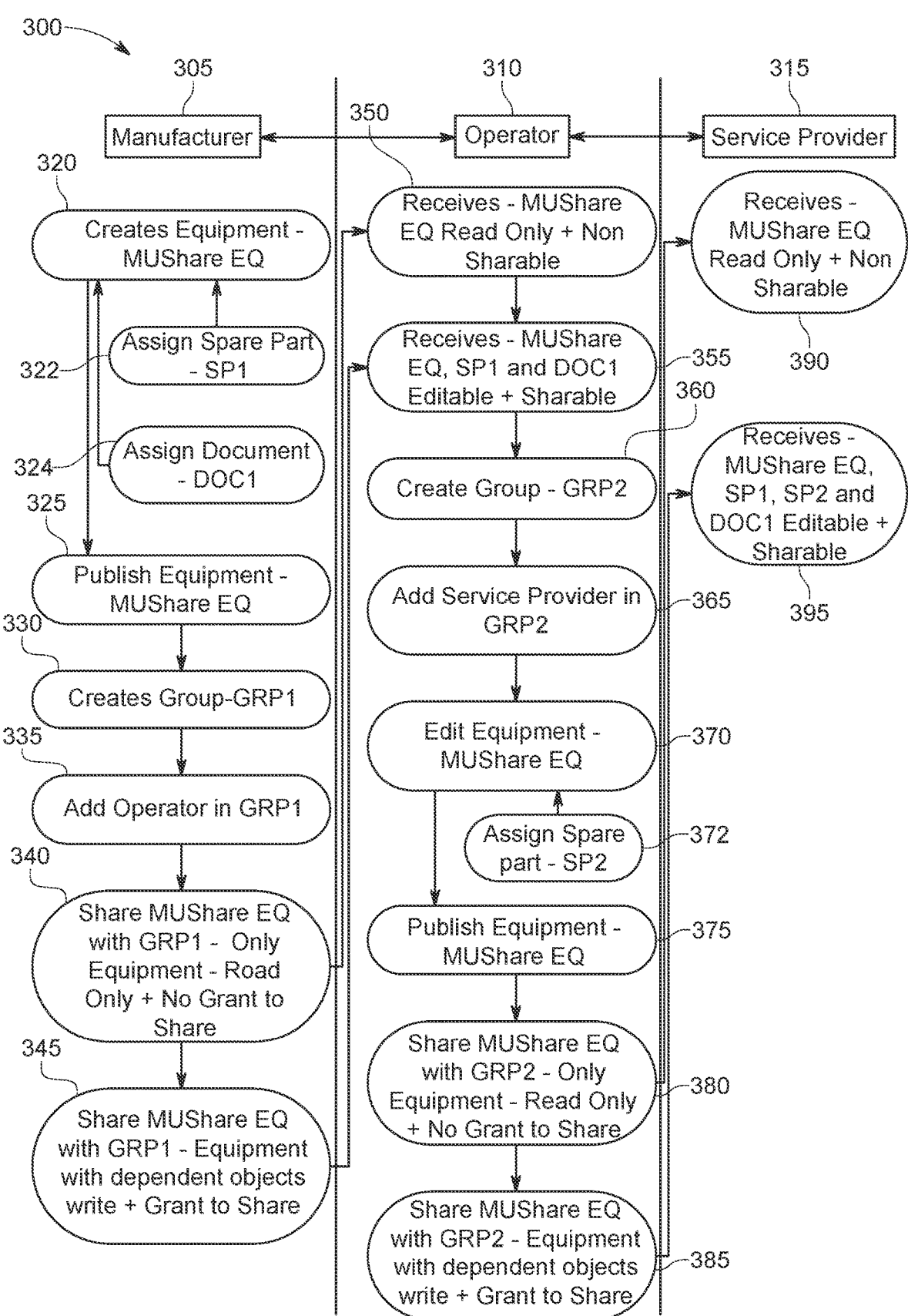
FIG. 3 is an illustrative process flow including a perspective of multiple users, according to an example embodiment.

FIG. 3 is an illustrative process flow 300 including a perspective of multiple users, according to an example embodiment. In some aspects, process 300 provides an overview of various operations related to systems, processes, and services for sharing in a multi-tier equipment management network herein from the perspective of users of the equipment management network. FIG. 3, similar to the examples used in the discussion of FIGS. 1 and 2, will be disclosed in the context of three entity users or consumers of an equipment management network, including an equipment manufacturer 305, an operator of the equipment 310, and a service provider 315 of the equipment. FIGS. 4-20 provide illustrative outward facing user interfaces related to systems, processes, and services for sharing in a multi-tier equipment management network, according to some example embodiments. Process 300 will be described, in part, with reference to one or more of FIGS. 4-20.

Figure 4:
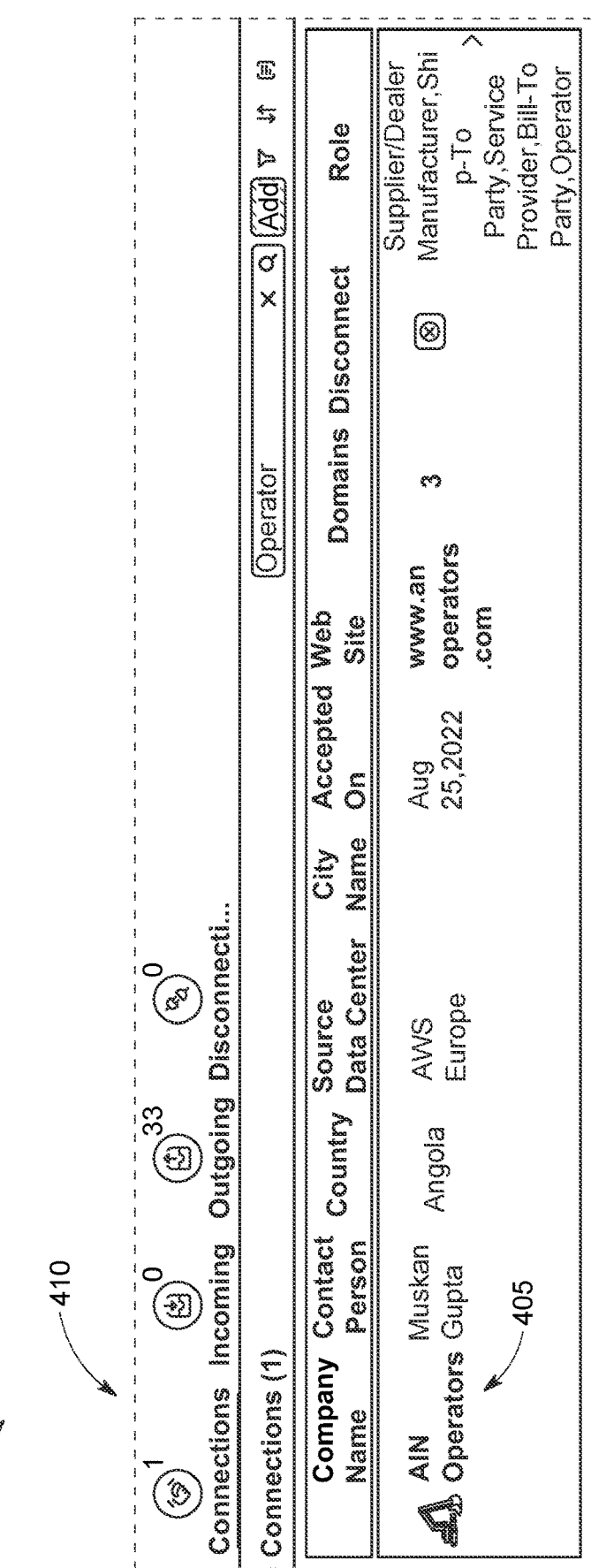
FIG. 4 is an illustrative outward facing user interface for connecting to different entities, according to an example embodiment.

In a preliminary step to process 300 and with reference to FIG. 4, an illustrative outward facing user interface 400 for connecting to different entities to each other, according to an example embodiment. As shown, in a connections tab 410, a connection is made via the equipment management network between a manufacturer and an operator as indicated at 405.

At 320, the manufacturer 305 creates an equipment (i.e., a particular type of object), either in a system (e.g., an ERP system) interfaced with the equipment management network or within the cloud-based equipment management network. Creation of the object associated with the equipment at 320 may further include creating one or more dependent objects of the equipment, such as a spare part object type at 322 and a document object type at 324.

Figure 5:
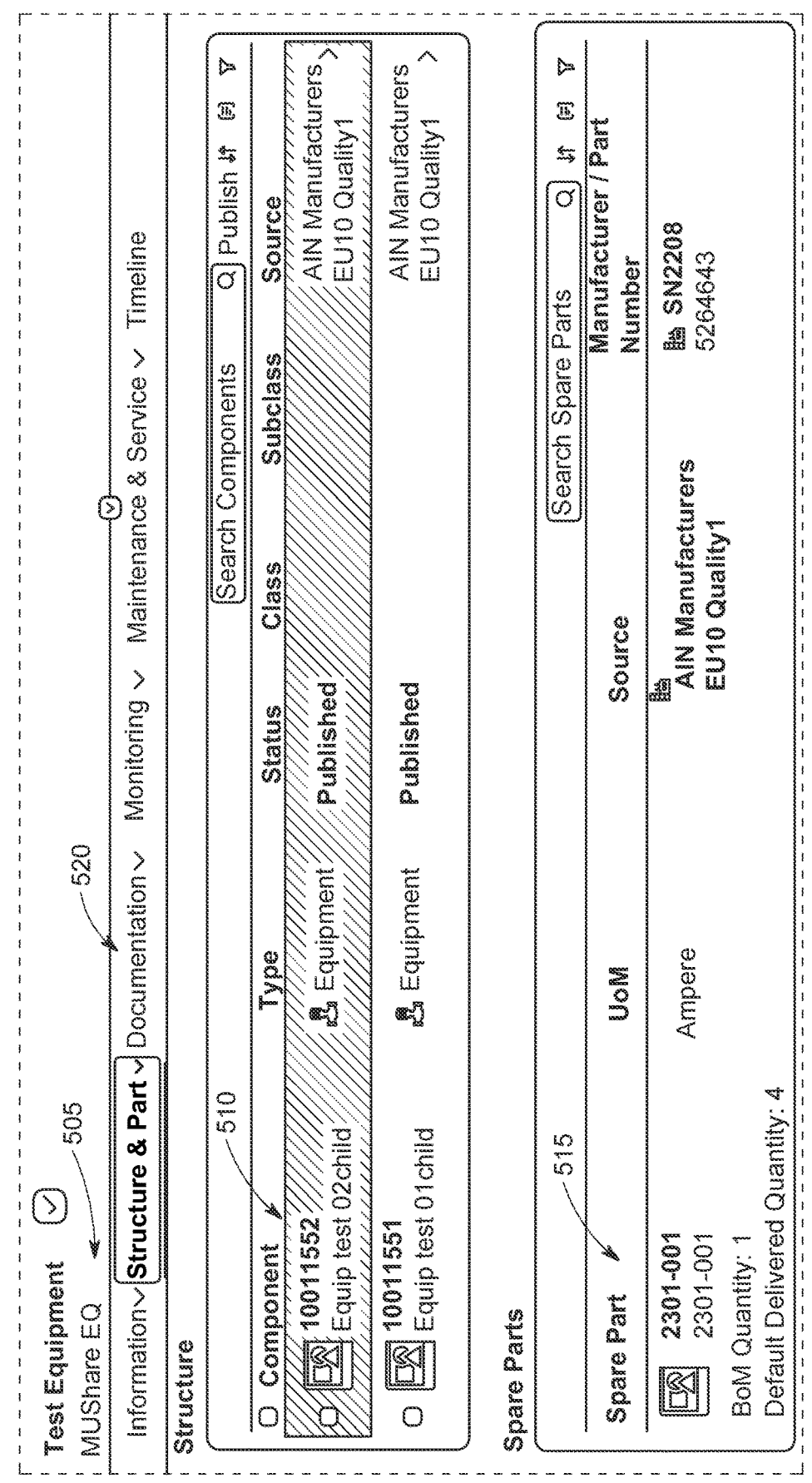
FIG. 5 is an illustrative outward facing user interface for creating groups, according to an example embodiment.

FIG. 5 is an illustrative outward facing user interface 500 for creating an object, according to some example embodiments. As illustrated, the equipment is created and named at 505 and includes component parts 510 and dependent or child objects including the spare part 515. Related documentation may be created by selecting the documentation tab 520 and defining the relevant documents (not shown) therein.

Figure 6:
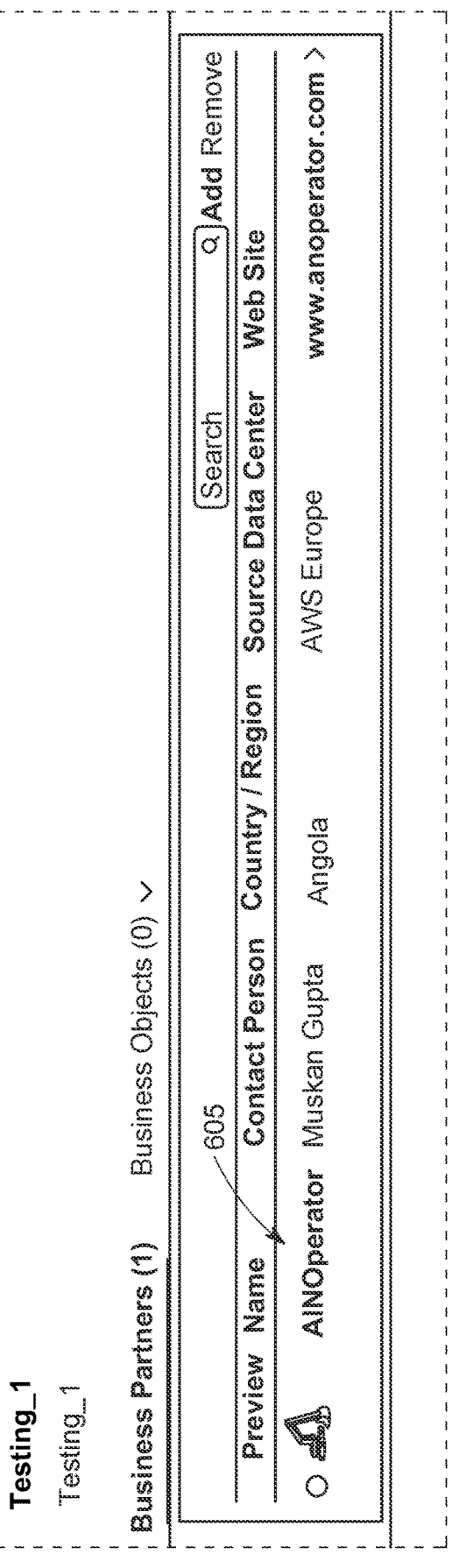
FIG. 6 is an illustrative outward facing user interface for creating an object, according to some example embodiments.

At operation 325, the equipment data object created by the manufacturer is published or otherwise made available for consumption via the equipment management network. At operation 330, the manufacturer creates a group (GRP1) and further adds the operator to the group at operation 335. FIG. 6 is an illustrative outward facing user interface 600 for creating groups, according to an example embodiment. As shown in FIG. 6, the operator connected to the manufacturer in FIG. 4 (depicted at 605 in FIG. 6) is included in the group created in FIG. 6.

At operation 340, the manufacturer, via the equipment management network, shares the equipment data object with the group GRP1, with read only rights and without grant to share rights. That is, the equipment data object is shared by the manufacturer with the group GRP1, wherein the manufacturer specifies the users in the group GRP1 can read the data object and cannot reshare the data object with other users via the equipment management network. Process 300 automatically proceeds, in response to the sharing at operation 340, from operation 340 to operation 350 where operator 310 receives the equipment data object shared by the manufacturer via the equipment management network with the read only rights and without grant to share rights.

At operation 345, the manufacturer, via the equipment management network, shares the equipment data object with the group GRP1, with the dependent objects 322 and 324, with write access rights, and with grant to share rights. That is, the equipment data object, the spare part type object, and the document type object are shared by the manufacturer with the group GRP1, wherein the manufacturer specifies the users in group GRP1 can write to the data objects and can reshare the data object with other users via the equipment management network. Process 300 automatically proceeds, in response to the sharing at operation 345, from operation 345 to operation 355 where the operator receives the equipment data object shared by the manufacturer via the equipment management network with the write rights and with grant to share rights (i.e., the data objects are editable by the GRP1 group users and can be further shared by the GRP1 users with other users).

FIG. 7 is an illustrative outward facing user interface 700 for sharing an object with a group of users, according to an example embodiment. As illustrated, UI 700 provides a mechanism to share with a group by including a listing of available groups (e.g., 6 different groups in UI 700), wherein the manufacturer has selected the group 705 that was created in the example of FIG. 6.

Figure 8:
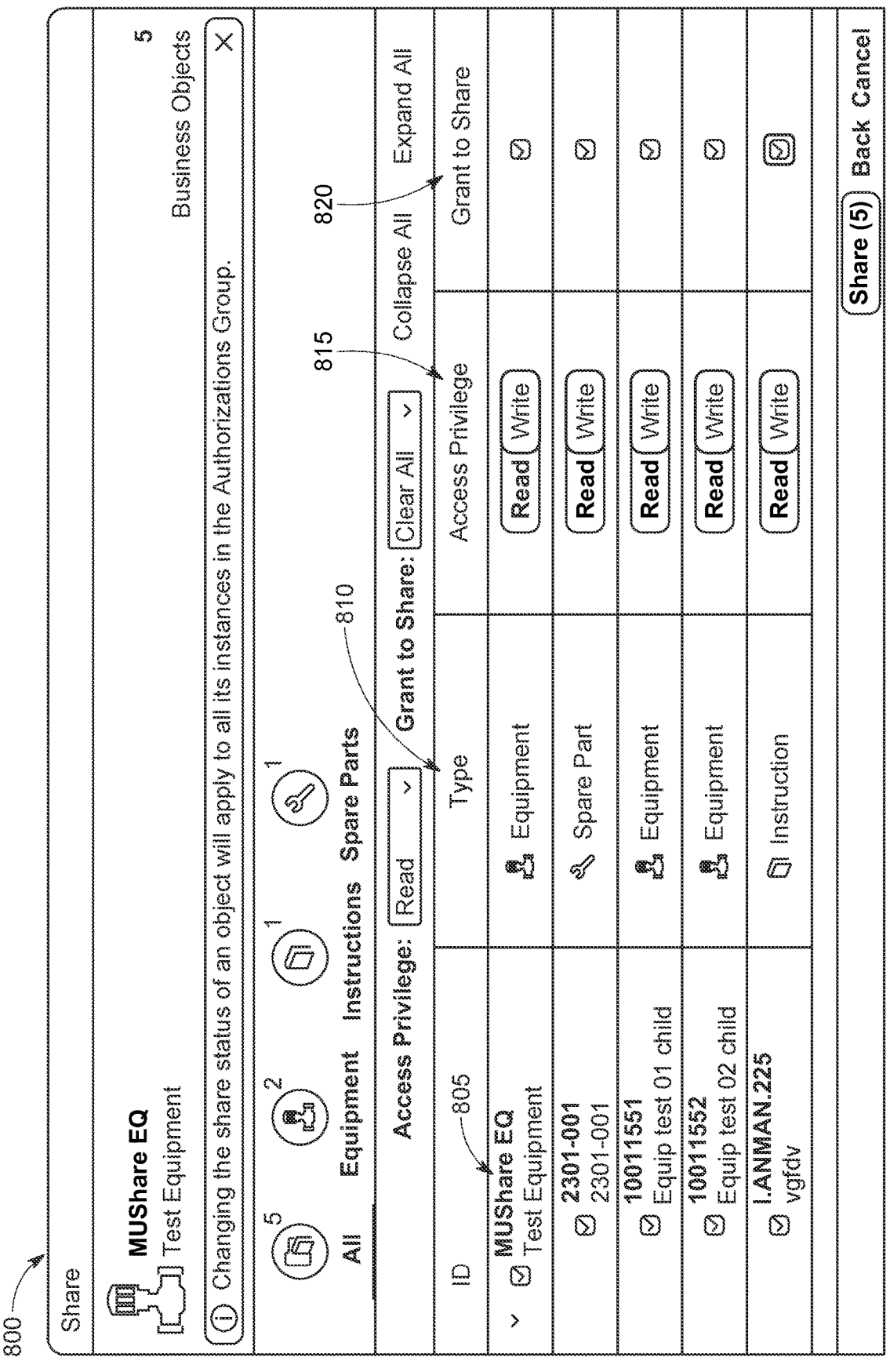
FIG. 8 is an illustrative outward facing user interface for specifying resharing rights for an object, according to an example embodiment.

FIG. 8 is an illustrative outward facing user interface 800 for specifying resharing rights for an object, according to an example embodiment. UI 800 includes a listing of data objects at 805, a listing of the object type 810 for each listed data object, the access rights assigned to the data objects at 815 (e.g., read only right or write access right), and a grant to share right (i.e., the right for a shared user of the data object to further share or reshare the data object with other users) at 820.

Figure 9:
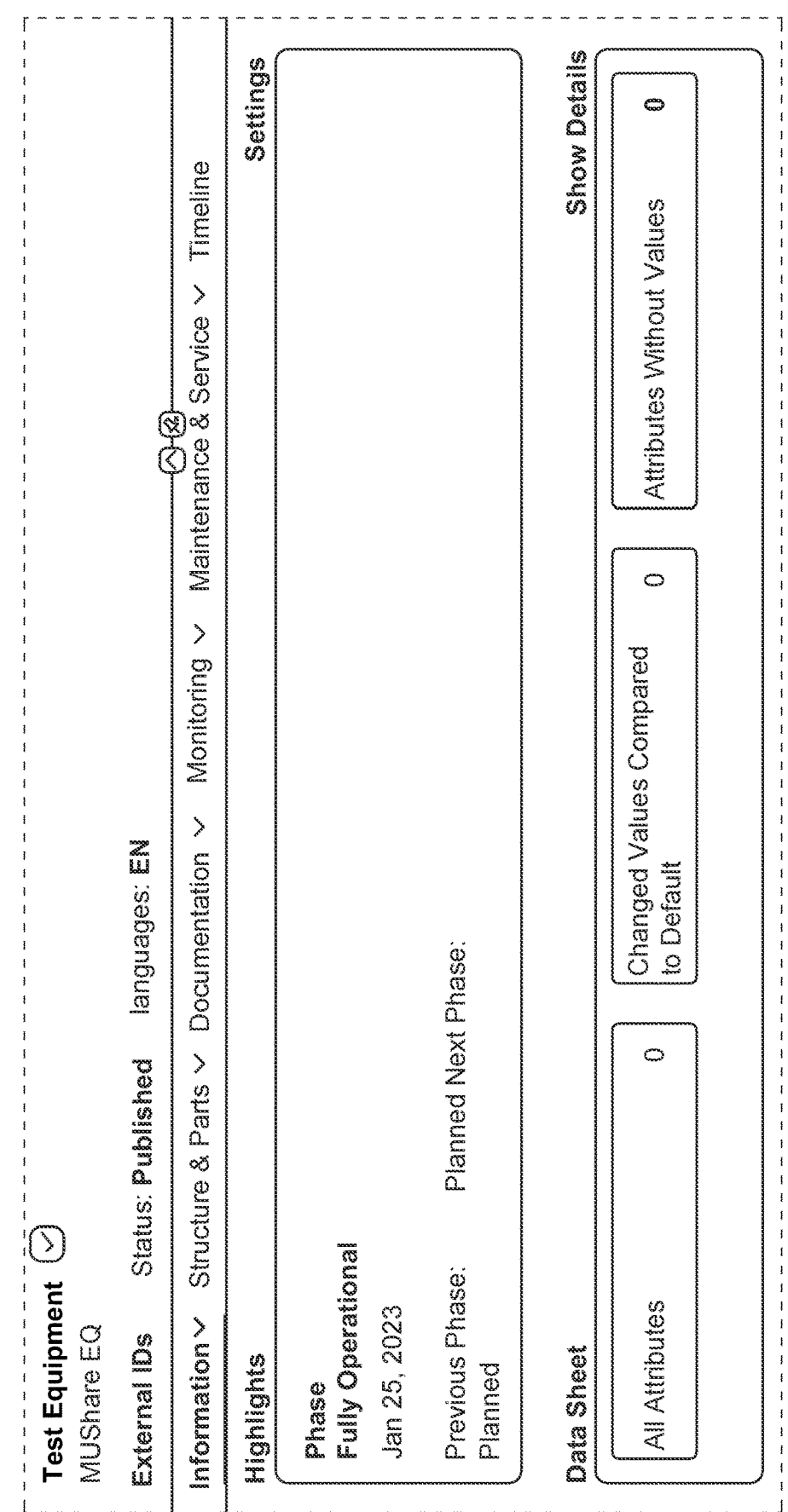
FIG. 9 is an illustrative outward facing user interface illustrating a status for an object, according to an example embodiment.
Figure 10:
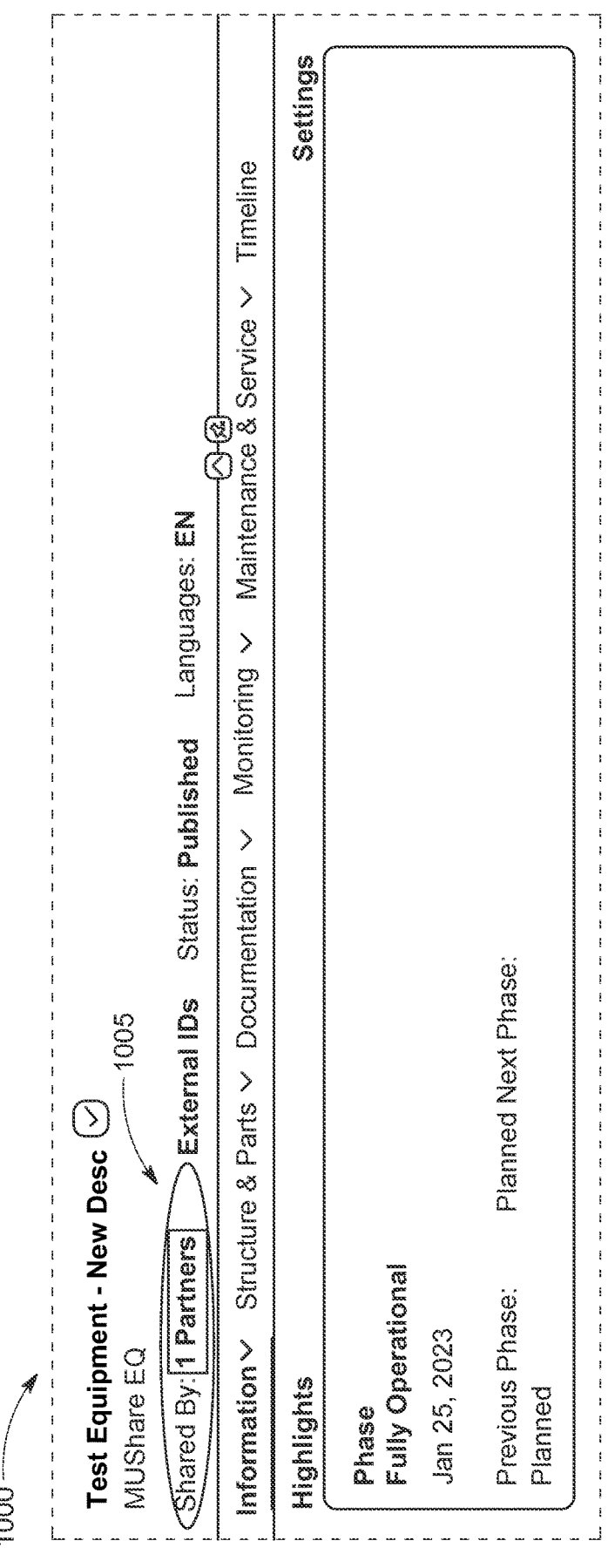
FIG. 10 is an illustrative outward facing user interface illustrating a status for some aspects of an object, according to an example embodiment.
Figure 11:
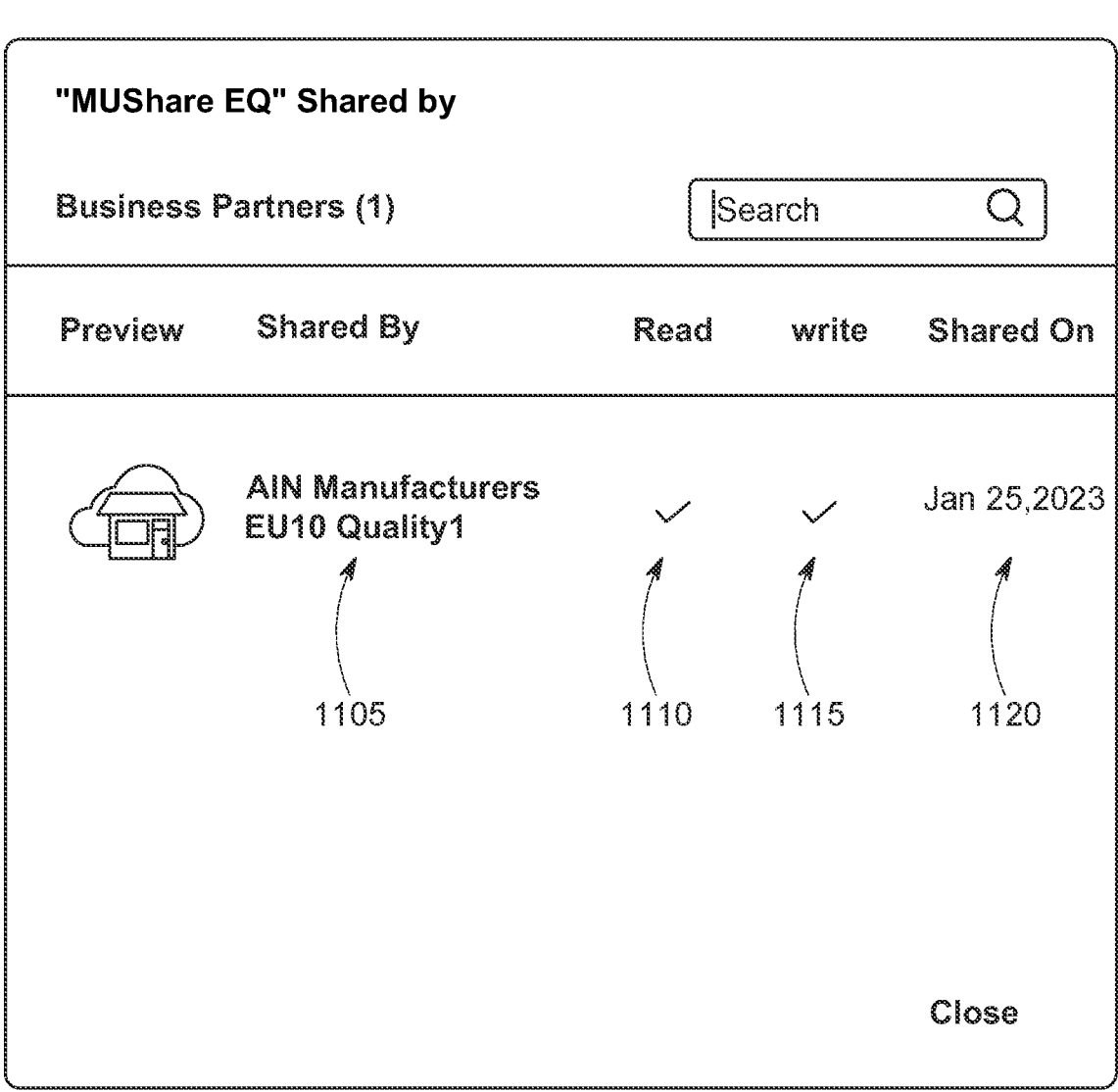
FIG. 11 is an illustrative outward facing user interface illustrating some details for a shared object, according to an example embodiment.

FIG. 9 is an illustrative outward facing user interface 900 related to an object, according to an example embodiment. UI 900 may comprise an initial login screen to an equipment management network including a collaboration service or application 120. In some instances, a user (e.g., an operator, service provider, etc.) may login to the equipment management network via their collaboration application or service tenant to see the equipment that has been shared with them by other entities (e.g., manufacturers). FIG. 10 further provides an illustrative outward facing user interface 1000 illustrating a status for some aspects of an object, according to an example embodiment. As depicted at 1005, UI 1000 shows, for the user (e.g., an operator) logged into the collaboration service or application, the equipment data object ("MUShare EQ") has been shared with the operator by 1 other user (i.e., partner). FIG. 11 is an illustrative outward facing user interface 1100 illustrating some additional details for the shared data object of FIG. 10, according to an example embodiment. In particular, FIG. 11 lists the particular entity or entities 1105 that shared the equipment data object with the user (e.g., an operator in the example of FIGS. 9-11), the access rights assigned to the shared data object at 1110 and 1115, as well as the date 1120 the entity (e.g., a manufacturer) specified at 1105 shared the equipment data object with the operator. In some aspects, an equipment management network herein may include a collaboration service or application (e.g., FIG. 1, 120) to provide and support the sharing of equipment data objects amongst a plurality of different entities. In one embodiment, the collaboration service or application, alone or in combination with other systems, applications, and services, might retain a record of the data objects shared and otherwise processed by the equipment management network, for example, in a database. In some example instances, when a data object is shared from a first user (a sender) to a second user (a receiver), an acknowledgement message or call regarding the executed sharing is sent to the collaboration service or application (and other service) by the sender or receiver, depending on a configuration of the equipment management network. In some embodiments, the record(s) of the executed sharing operations may be implemented in one or more data logs, lookup tables, and other data structures.

Returning to FIG. 3, at operation 360 operator 310 creates a group GRP2. The operator may define and create the group by accessing the equipment management network herein. At operation 365, the operator adds an outside service provider that services the operator's equipment to the group GRP2 created at operation 360. Continuing to operation 370, the operator edits the equipment data object, including adding a spare part SP2 to the equipment data object at 372. At operation 375, the operator publishes or otherwise releases the equipment data object modified at operations 370 and 372 for consumption.

At operation 380, the operator, via the equipment management network, shares the equipment data object with the group GRP2, with read only rights and without grant to share rights. In other words, the equipment data object is shared by the operator with the group GRP2, wherein the operator specifies the users in the group GRP2 can only read the data object and they cannot reshare the data object with other users via the equipment management network. Process 300 automatically proceeds, in response to the sharing at operation 380, from operation 380 to operation 390 where the outside service provider in GRP2 receives the equipment data object shared by the operator via the equipment management network with the read only rights and without grant to share rights.

At operation 385, the operator, via the equipment management network, shares the equipment data object and the dependent objects thereof with the group GRP2, with write access rights and with grant to share rights. That is, the equipment data object is shared by the operator with the group GRP2, wherein the operator specifies the users in group GRP2 can write to the data object and they can further reshare the data object with other users via the equipment management network. Process 300 automatically proceeds, in response to the sharing at operation 385, from operation 385 to operation 395 where the outside service provider in GRP2 receives the equipment data object shared by the operator via the equipment management network with the write access rights and the grant to share rights (i.e., the data objects are editable by the GRP2 group user(s) and can be further shared by the GRP2 users with other users).

FIG. 12 is an illustrative outward facing user interface 1200 wherein the operator shares the equipment data object with the group GRP2 service provider(s), according to an example embodiment. In the example of FIG. 12, the operator selects the group "My Connected Partners" 1205 that includes 11 users as seen at 1210. The operator further invokes the share button at 1215 to share the equipment data object with the specified group.

Figure 13:
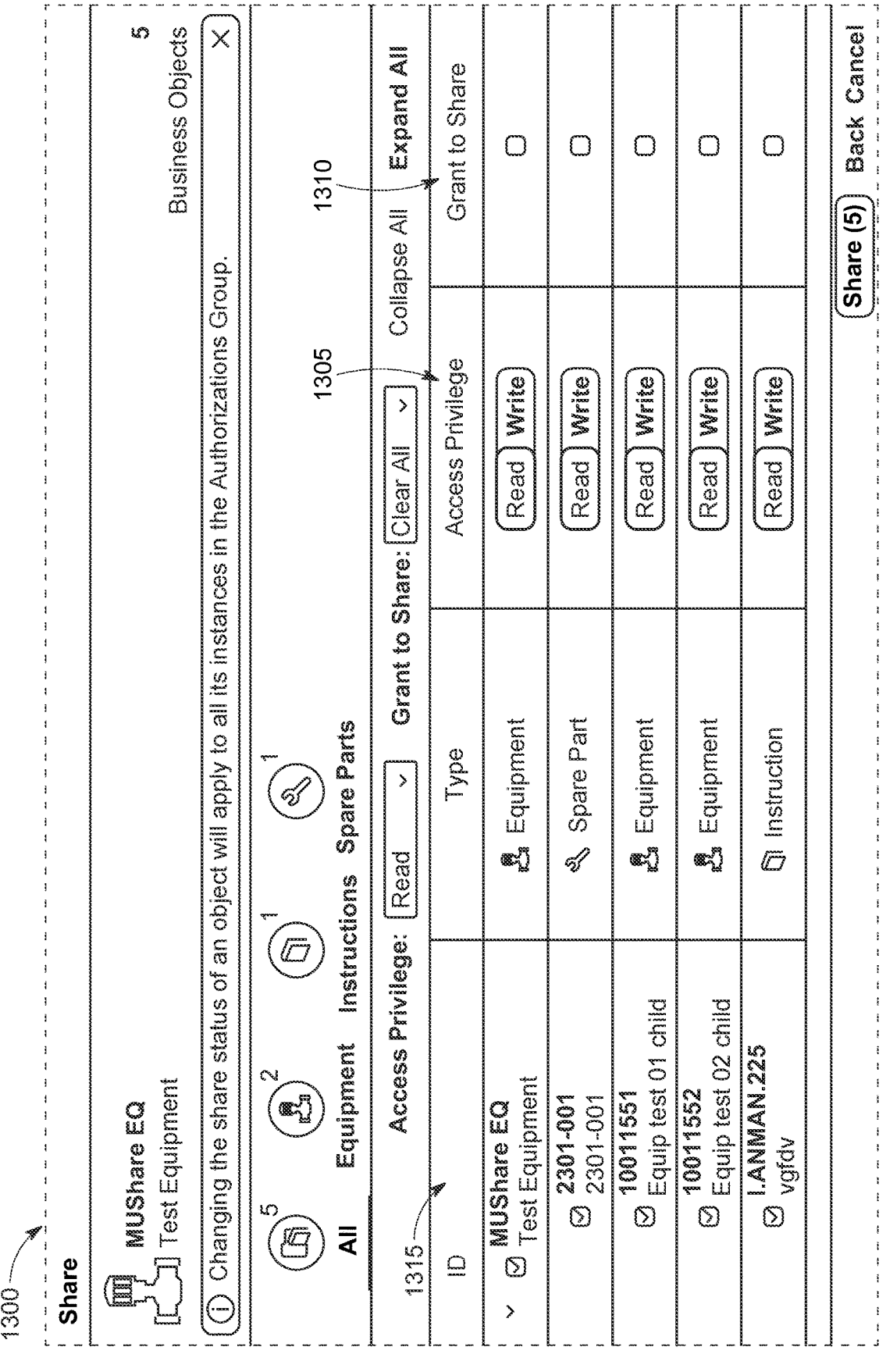
FIG. 13 is an illustrative outward facing user interface for specifying resharing rights for an object, according to an example embodiment.

FIG. 13 is an illustrative outward facing user interface 1300 for specifying resharing rights for data objects shared with the group specified in FIG. 12, according to an example embodiment. As shown, UI 1300 provides selective interface controls for the operator to specify the access privileges 1305 and the grant to share rights 1310 to assign to the data objects 1315.

Figure 14:
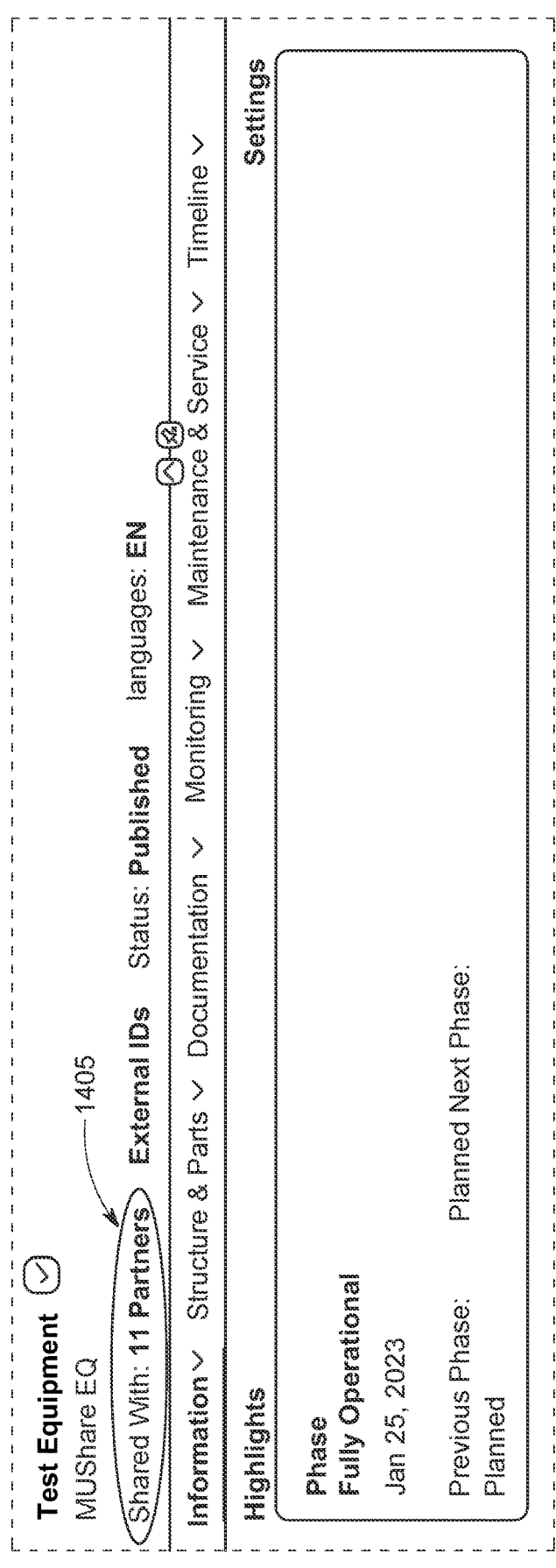
FIG. 14 is an illustrative outward facing user interface illustrating some aspects of a status for a shared object, according to an example embodiment.

FIG. 14 is an illustrative outward facing user interface 1400 illustrating, after the operator has shared the equipment data object with the group depicted in FIG. 12, some aspects of a status for a shared data object, according to an example embodiment. In the example of FIG. 14, the manufacturer of the shared equipment "MUShare EQ" is logged into the equipment management network and presented with UI 1400. As shown at 1405, the manufacturer is presented with a display indicating the equipment data object for the equipment "MUShare EQ" has been reshared with 11 other users (i.e., service provider partners of the operator).

Figure 15:
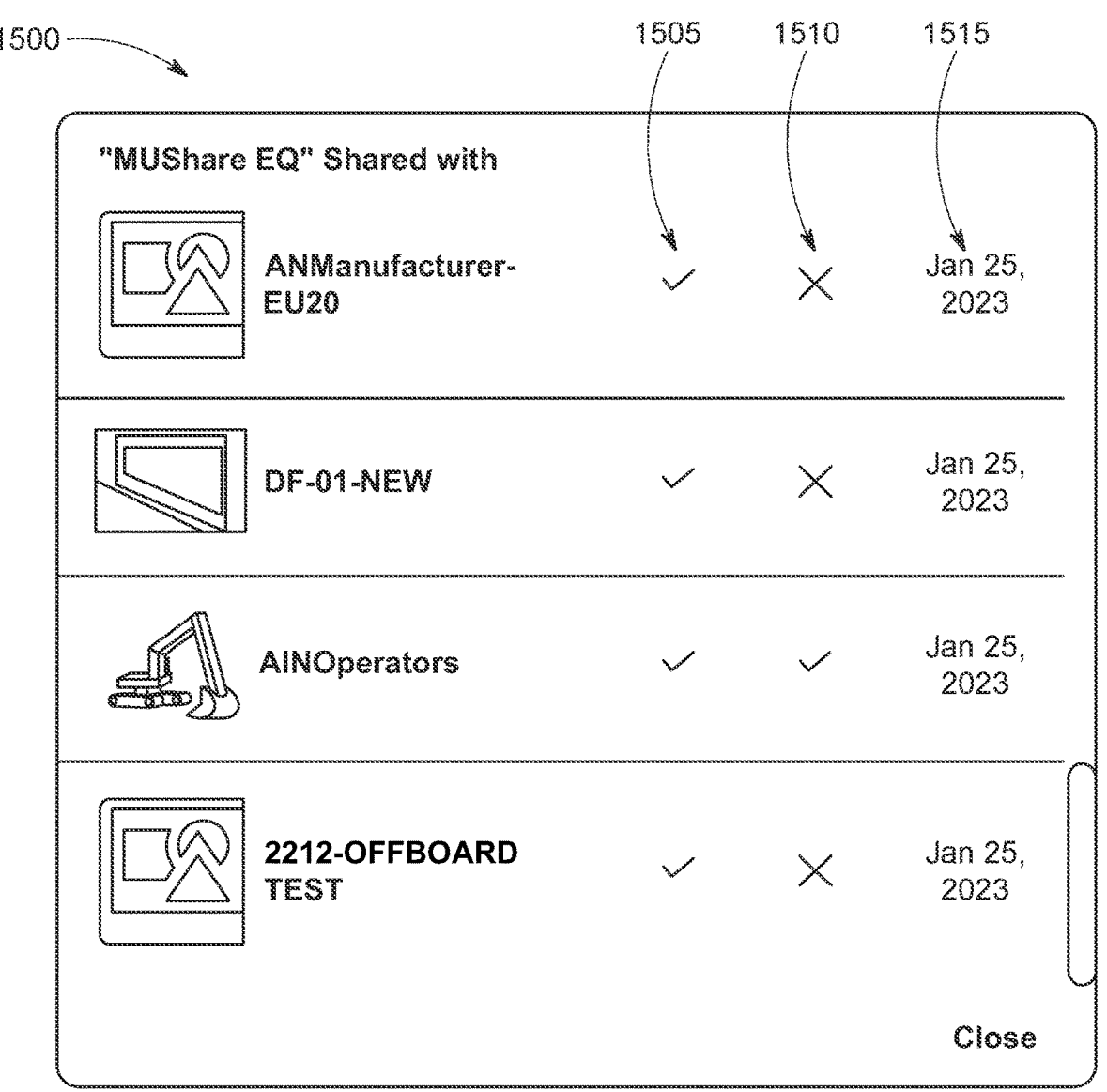
FIG. 15 is an illustrative outward facing user interface illustrating some other aspects of a status for a shared object, according to an example embodiment.

FIG. 15 is an illustrative outward facing user interface 1500 illustrating some other aspects of a status for a shared object, according to an example embodiment. Continuing the example of FIG. 14, FIG. 15 lists, for the manufacturer, the entities (e.g., the service provider partners in group GRP2 indicated in FIG. 12, including "ANMaufactuer-EU20", "DF-01-NEW", "AINOperators", etc.) with whom the equipment data object "MUShare EQ" was reshared (i.e., the eleven (11) partners specified in FIG. 14, where the list of service provider partners is scrollable). As shown, UI 1500 also provides a listing of the read only rights 1505 and write access rights 1510 assigned to each reshared data object, and the date the subject data objects were reshared at 1515.

In some aspects, as demonstrated by one or more of the foregoing examples, the present disclosure provides a mechanism, via the equipment management network (e.g., FIG. 1, system 100), where the an owner of a data object (e.g., a manufacturer in the examples of FIGS. 1 and 3) can see all of the business partners associated with or connected to an asset, equipment, or other type of data object at any point in the lifecycle of the data object within the equipment management network. In this manner, for example, after the owner of the data object makes change(s) to an object associated with the equipment data object (e.g., an instruction manual, spare pare, the equipment data object type, etc.), the manufacturer can reshare the changed data object to all of the relevant business partners (e.g., specified individual users and users of specified groups, etc.) because they know the partners in the network who have an interest in the assets instruction manual.

In some embodiments, the present disclosure provides a system and process so that when a manufacturer (or other asset owner) makes change(s) to a data object associated with an equipment (e.g., a spare part, instruction manual, etc.), the changes may be automatically propagated (i.e., without further action by a user) to the multiple different business partners/entities with whom the document has been shared and reshared. This is one illustrative example of a practical, technical benefit that any entity operating within an equipment management network of the present disclosure might enjoy as provided by the equipment management network that supports and facilitates the sharing information amongst users at different levels or tiers.

Figure 16:
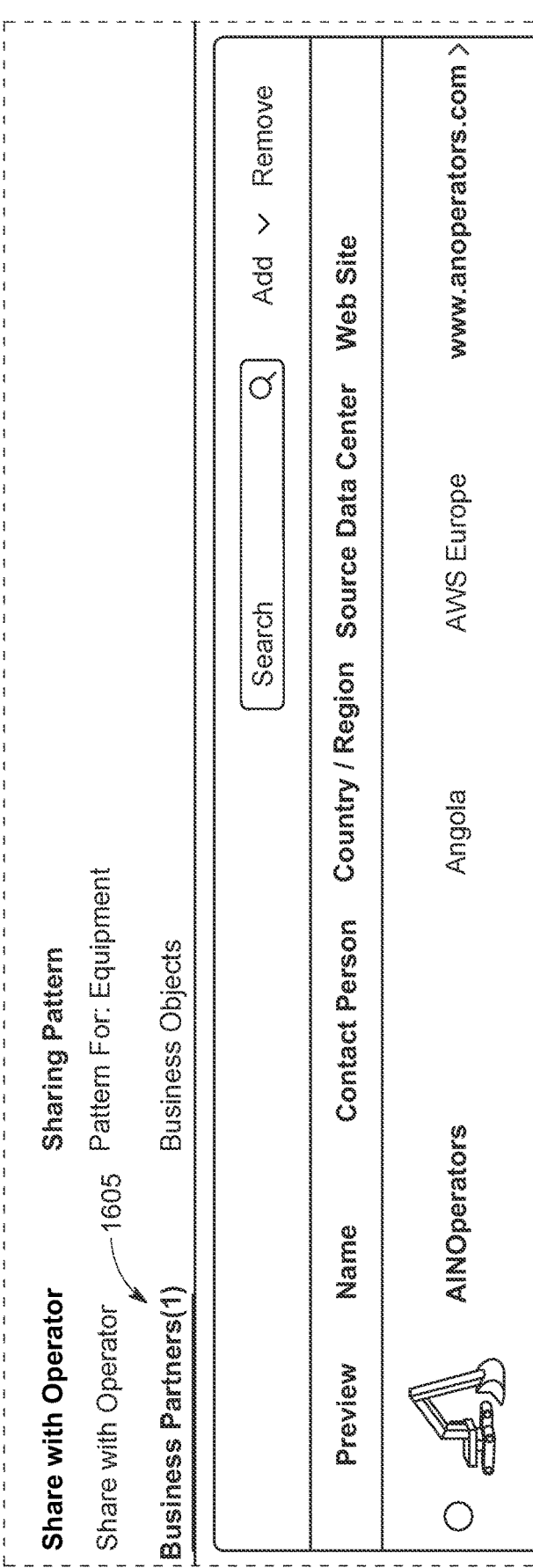
FIG. 16 is an illustrative outward facing user interface for specifying automatic sharing, according to an example embodiment.

FIG. 16 is an illustrative outward facing user interface 1600 for specifying automatic sharing, according to an example embodiment. In some embodiments, an equipment management network of the present disclosure might provide a mechanism to define rule(s) specifying that when equipment/asset is created with some specified information, the specified information is to be automatically shared with one or more other users (i.e., my operators, etc.). The automatic sharing aspects of the present disclosure are supported, at least in part, because the equipment management network maintains an accurate data records of, for example, the operator(s) for a given equipment, insurer(s) for the equipment, a dealer for the equipment, and other service providers or users associated with the equipment. Based upon the information associated with that equipment, including but not limited to the users or other entities connected to the equipment and the owner of the data object representing the equipment, the equipment management network provides a framework where the equipment information managed and accessible via the equipment management network, after it is created, published or otherwise ready to be shared with other users, might be automatically shared with specified, designated other users or partners based upon one or more predetermined rules.

In FIG. 16, a "sharing pattern" is created, where an operation or sequence of operations are defined for automatically sharing equipment or other types of data object information with one or more other users. As shown in FIG. 16, other users (e.g., business partners of the owner of the equipment/asset shown under tab 1605) may be selected by navigating to the Business Partners tab and selecting one or more of the listed users representations presented in the UI. The other user(s) specified in UI 1600 will have data objects automatically shared with them in response to the occurrence one or more defined actions. In some instances, the defined actions might include, for example, the publication of an update to a maintenance manual to the equipment management network, either a single action or in combination with one or more other actions, as specified within a defined sharing pattern. In some instances, the sharing pattern can be associated with one or more groups of other users, not just individual users as shown in the example of FIG. 16.

In this manner, practically speaking, once a change (or other triggering event or sharing pattern) is made to some specified equipment, then the change(s) are automatically shared with the relevant other user(s) (i.e., those other users having an interest in the change(s)/event(s) based on the other users previously being shared and reshared the same or a previous version of the data object associated with the specified equipment in a defined sharing pattern).

FIG. 17 is an illustrative outward facing user interface 1700 wherein a data object owner/creator can choose or otherwise specify, for the automatic sharing pattern being defined for the specified user(s) designated in FIG. 16, what particular data objects 1705 associated with the equipment is to be shared (if any at all) and whether the data objects associated with this equipment is to be shared automatically at 1710. In the example of FIG. 17, a pattern for one operator is created specifying equipment information, documentation, instruction manuals, other documents, spare parts, and complete structure is to be shared with read rights and write rights (i.e., privileges 1715) for the "equipment" type. In an example for another operator, the owner might specify they want to share this equipment only with the structure and documentation, wherein no spare parts information is shared with this other operator. As such, a manufacturer (or other data object creator) can selectively define the rule(s) for automatically sharing asset information with each other user (e.g., an operator or other designated receiver of shared information). In some embodiments, the rule(s) specifying, for example, the particular data objects associated with an equipment that are to be shared (if any at all) and whether the data objects associated with that equipment are to be shared automatically may be stored with the data objects. For example, in one embodiment a data structure representation of a data object herein may include data field(s) or other component(s) that include a specification, value, or indication of a rule defining whether the data object is to be automatically shared and if so, the privileges associated with the sharing. In some embodiments, once the automatic sharing rules/patterns have been established, the corresponding information associated with that data object may be automatically shared in the background (i.e., without any intervention, assistance of the creator of the data object, in some instances not even a notification of the automatic sharing of asset information is generated, although a record may be maintained for security, auditing purposes).

After the configuration of pattern/rules for automatic sharing are established as illustrated in FIGS. 16 and 17 and a data object is shared automatically, the receiver of the shared asset information may be able to see the information that was automatically shared with them, including the privileges associated with the automatically share information, when it was shared, and who shared the information.

Figure 18:
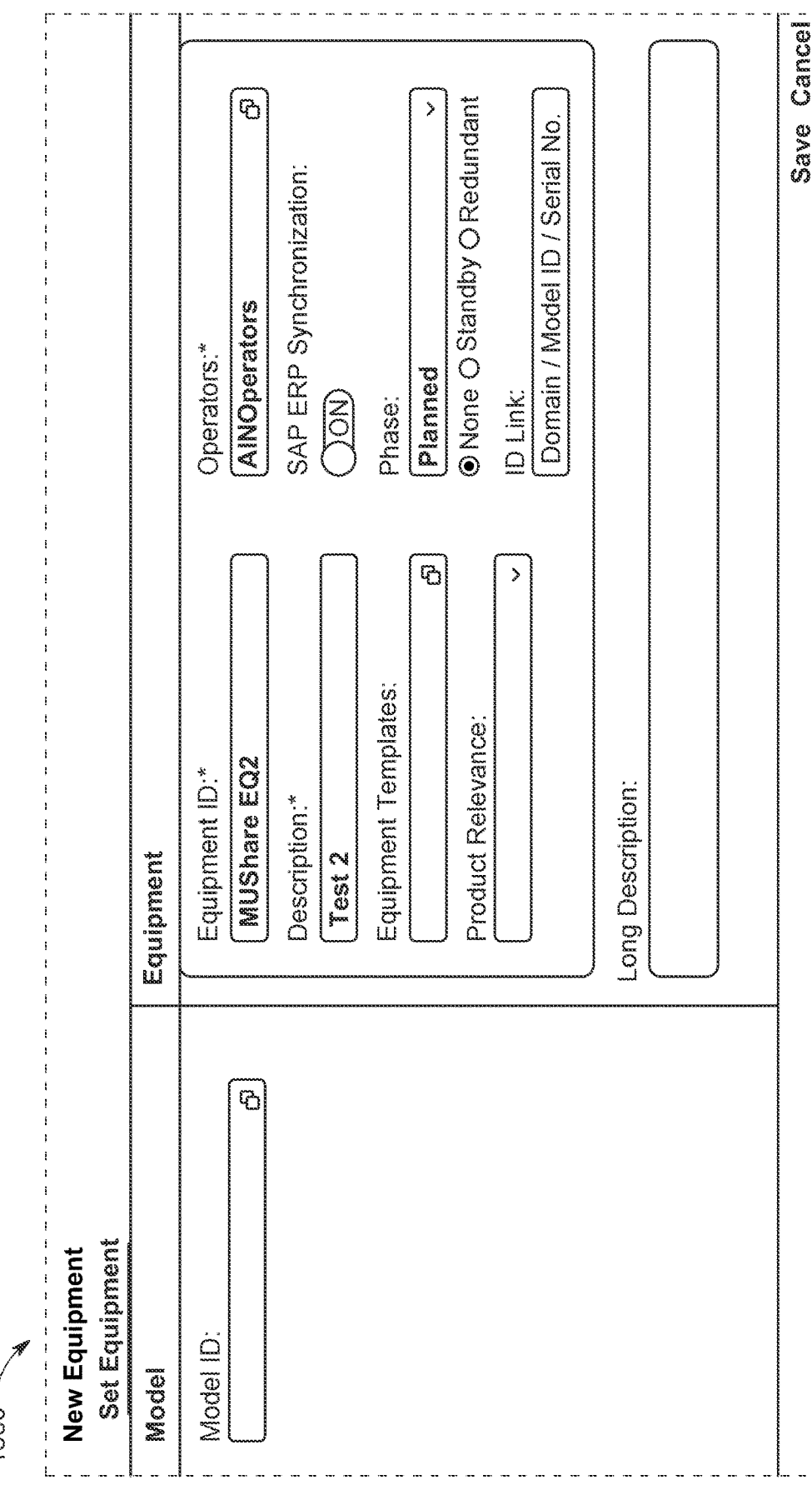
FIG. 18 is an illustrative outward facing user interface illustrating the creation of an object for automatic sharing, according to an example embodiment.

In FIG. 18 as illustrated in UI 1800, the owner of the data object associated with an equipment creates the equipment (e.g., "MUShare EQ2") and publishes it. As an owner of the object, the manufacturer can also view with whom it is (automatically) shared, when it is shared, the privileges it is shared with, and whether other users can further reshare the data object. This information may, in some embodiments, always be made visible by the owner of the data object.

Figure 19:
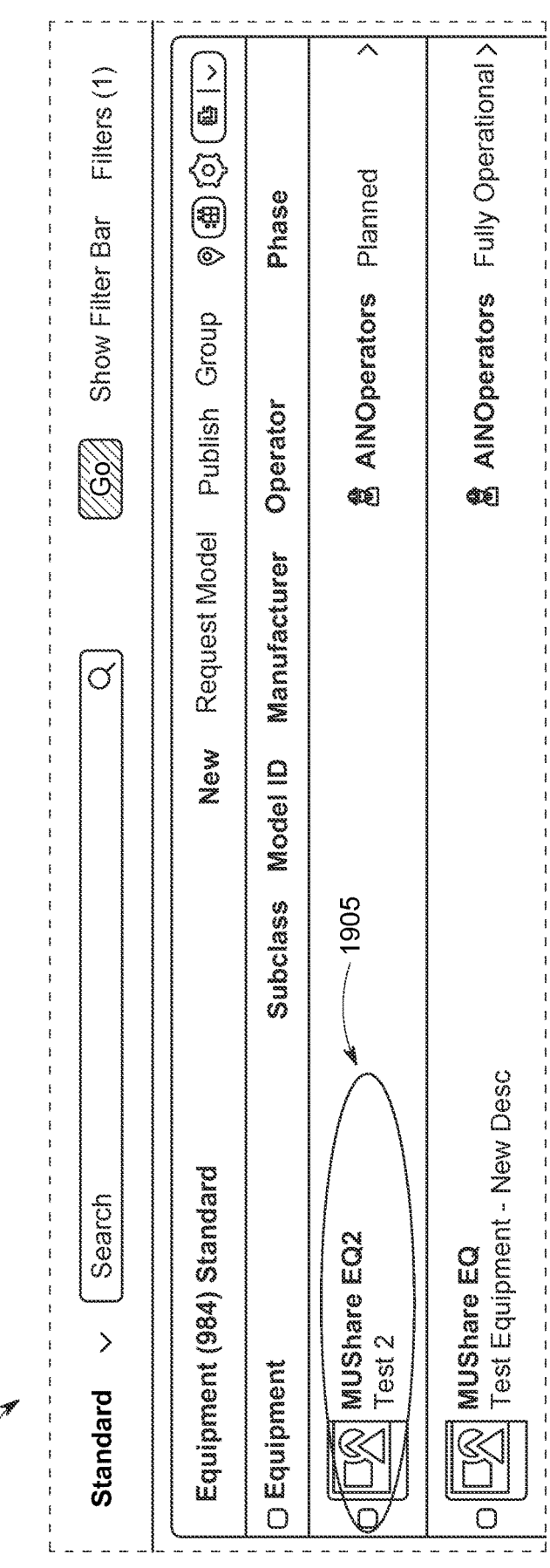
FIG. 19 is an illustrative outward facing user interface illustrating a status for an automatically shared object, according to an example embodiment.

Likewise, when a data object is shared and an operator (or other receiver of the shared data object) logs into his equipment management network tenant, the operator may be presented with information as illustrated in UI 1900 of FIG. 19 that provides a presentation of equipment shared with the receiving operator. In this example, the operator did not recreate this data object (e.g., the digital twin). Instead, the data object 1905 has been shared with the operator from the manufacturer/owner and the operator may thereafter commence operating/using it.

In some aspects, for the "automatic sharing" herein, once a pattern or rule is defined, the moment that the data object is published, the relevant (as specified in the "pattern" that defines the automatic sharing rule(s) and actions) receiver(s) to whom the data object is to be shared automatically receive the shared information. With this feature, the owner of the data object is not explicitly sharing the asset associated information, so that process is automatic. No additional action is required by the owner other than creating the asset (or other triggering event associated with the asset/equipment) and the created data object will automatically (in the background) be sent or made accessible to the receiver, wherein the receiver will be able to access the data object per the rights associated with the data object the particular receiving other user.

In some aspects, the automatic multilevel sharing framework disclosed herein may be extended to manage and process objects other than the equipment associated data objects discussed in the specific examples herein. For example, data objects related to work orders, notifications, etc. may be included in one or more use cases for the system and processes disclosed herein, where object-specific rules may also be defined so that the sharing, as a framework, can automatically work and share the relevant information with the relevant parties based upon the rules that have been set for each of the interested receiving partners.

Referring to previous examples above, when a manufacturer shared a data object associated with an equipment with an operator, the manufacturer may assign "grant to share" rights with the data object. The operator might then reshare the data object that included the grant to share rights with their associated partners (e.g., a service provider). However, in some embodiments, the service provider might not be able to further (re)share this information because the operator does not have reshare permissions since the reshare permissions can only be provided by the data object creator or owner (e.g., reshare permission are not provided to other users). In some embodiments, another feature disclosed herein is referred to as "unlimited sharing grant" functionality and aspects thereof are illustrated, at least in part, in FIG. 20. In some aspects, using unlimited sharing, the owner of the data object can specify, for one or more objects associated with an equipment, that whoever has access to a data object can further (re)share the particular data object without receiving the reshare permission(s) from the object owner. As shown in UI 2000 of FIG. 20, there is a listing of data objects 2010 under the "Unlimited Share" tab 2005, where the owner of the listed data objects may selectively specify whether the listed data objects are configured for unlimited sharing. By being designated or otherwise defined or specified as having "unlimited share" rights or privileges, a user having access to this data object can also further reshare the data object with their respective partners (i.e., other connected users) without receiving explicit reshare permission from the data object creator or owner. In some aspects, this type of configuration may be created in the presently disclosed network so that certain specified data objects can be further shared to the various partners associated with the equipment at various stages of the equipment's life cycle.

Note, at any point of time when asset information is shared, a manufacturer as owner of this object can be presented with a complete overview of both who has access to his equipment (i.e., data objects) and when they were given the access for this equipment, as a minimum in some instances.

In some instances, when data objects are being shared in an equipment management network herein, the owner of the data objects may want to ensure the data objects are shared responsibly, being careful with whom the data objects are shared. For example, the data object owner might not want certain information to be shared with their competitors or others because some information might be confidential or otherwise sensitive. In some instances, the data object creator and owner might, within the disclosed equipment management network, create a "block list". In some aspects, a block list herein may include a listing (or other configured data structure) that maintains an indication or representation of users that are restricted, prohibited, or otherwise blocked from (re)sharing data object information. The block list might apply to specific data object information (e.g., one or more instructions manuals, repair histories, etc.) or all information associated with a particular data object. In some embodiments, entities listed in a block list may see or otherwise have access to information only if it is shared directly by the asset creator or owner. If a user on a block list is potentially provided access to information shared by a user other than the data object's creators, then the blocked entities will not be able to view that information in the network. (e.g., a check is run against the block list when the permission is provided by some entity other than directly by the data object owner; or always run to verify any "blocks" on the data object).

In some aspects, sharing of data objects via an equipment management network herein might be invoked, initially or otherwise, in response to a request for information from one or more users of the equipment management network. For example, an operator user of an equipment management network might want certain information related to a particular equipment and the operator may request the information from the manufacturer of the equipment prior to creating the desired information anew. In one example, the operator might want a digital twin or model of the equipment in order to better maintain and operate the instance of the equipment deployed in their plant. Instead of creating the model themselves in their ERP system or via a cloud platform or service providing such functionality, the operator may instead request the model from the manufacturer of the equipment via a model request. The model request, in some aspects, starts a two-way communication, via the equipment management network, between the operator and the manufacturer. In some regards, the model request provides a mechanism for one user (e.g., the operator) of the equipment management network to request information or a data object (e.g., a model) from another user (the manufacturer) of the equipment management network.

In some embodiments, a request via the equipment management network may relate to a model (e.g., a model request), an equipment (i.e., a n equipment request), a template (i.e., a template request, a document (i.e., a document request), and other object types.

Continuing with the model request example, the equipment management network provides a mechanism (e.g., user interfaces) for a user to request information (e.g., data object(s)) from another user. The request may typically include one or more of a description or indication of what information is requested, from whom the information is requested, when the information is requested, and the privileges with which the information is requested (e.g., access rights and/or grant to share rights, etc.). In some embodiments, such as FIG. 1, the equipment management network 115 may maintain up-to-date records of all requests in a data store (e.g., 125), including the particular details related to all requests herein. A request for information may be fulfilled by the target of the request by having the equipment management network provide access to the requested information (e.g., data objects) to the requesting user. For example, the operator may request a model of the equipment from the manufacturer via the equipment management network (e.g., the request might include, for example, a serial number, a part number, a specific model number, etc.), the manufacture may receive a notification of the request via the equipment management network, the manufacturer may respond to the request by requesting clarification if the request is unclear or by sharing the model with the operator via the equipment management network, and the equipment management network may further provide a notification (i.e., a confirmation) that the requested data objects have been provided to the operator via the equipment management network. In some embodiments, the requested information (e.g., data objects) may be shared with the requesting user using one or more of the sharing techniques and processes disclosed herein. That is, the request feature(s) disclosed herein may be compatible with other aspects of the present disclosure.

Figure 21:
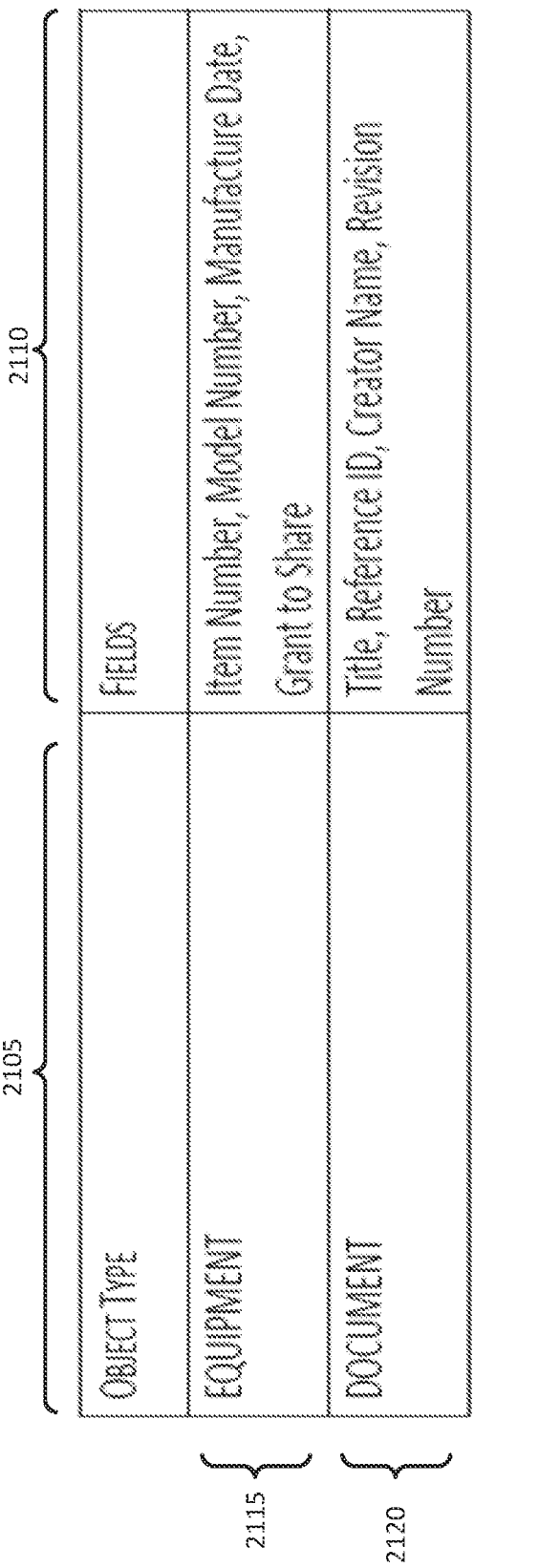
FIG. 21 is an illustrative depiction of a representation of example data related to an an equipment management network and service.

FIG. 21 is an illustrative depiction of a representation of example data related to an equipment management network and service, according to an example embodiment. As shown, table 2100 may represent data that is stored and maintained by a collaboration platform of an equipment management network herein. Columns 2105 and 2110 refer to an object type and data fields, respectively. As shown, table 2100 lists a number of field parameters for a "Equipment" 2115 object type and a plurality of field parameters for a "Document" 2120 object type. In some instances, an indication of a "grant to share" right assigned to a data object by a creator or other owner of the data object might be included in a field 2110 of a data structure representation of the data object, as illustrated in the example of FIG. 21. The data fields depicted in FIG. 21 are illustrative and not necessarily a complete or exhaustive listing of the number and type of fields and field parameters herein. For example, one or more of the parameters in data fields 2110 associated with a data object herein might specify or indicate whether the data object may be automatically shared (not explicitly shown in FIG. 21) and if so, the privileges associated with the sharing (e.g., "grant to share" rights, read rights, write rights, etc.). Specific instances of data modeled on table 2100 might be persisted by a collaboration platform for an initial loading of an object associated with an equipment and an updating of the object. In a scenario where an object changes (e.g., the object is modified by a user having a role permitting them to edit the object and the object being editable based on the rights associated therewith), such that the data associated with the data object changes, then the data changes may be replicated and automatically pushed to the collaboration platform in an updated replicated object.

Figure 22:
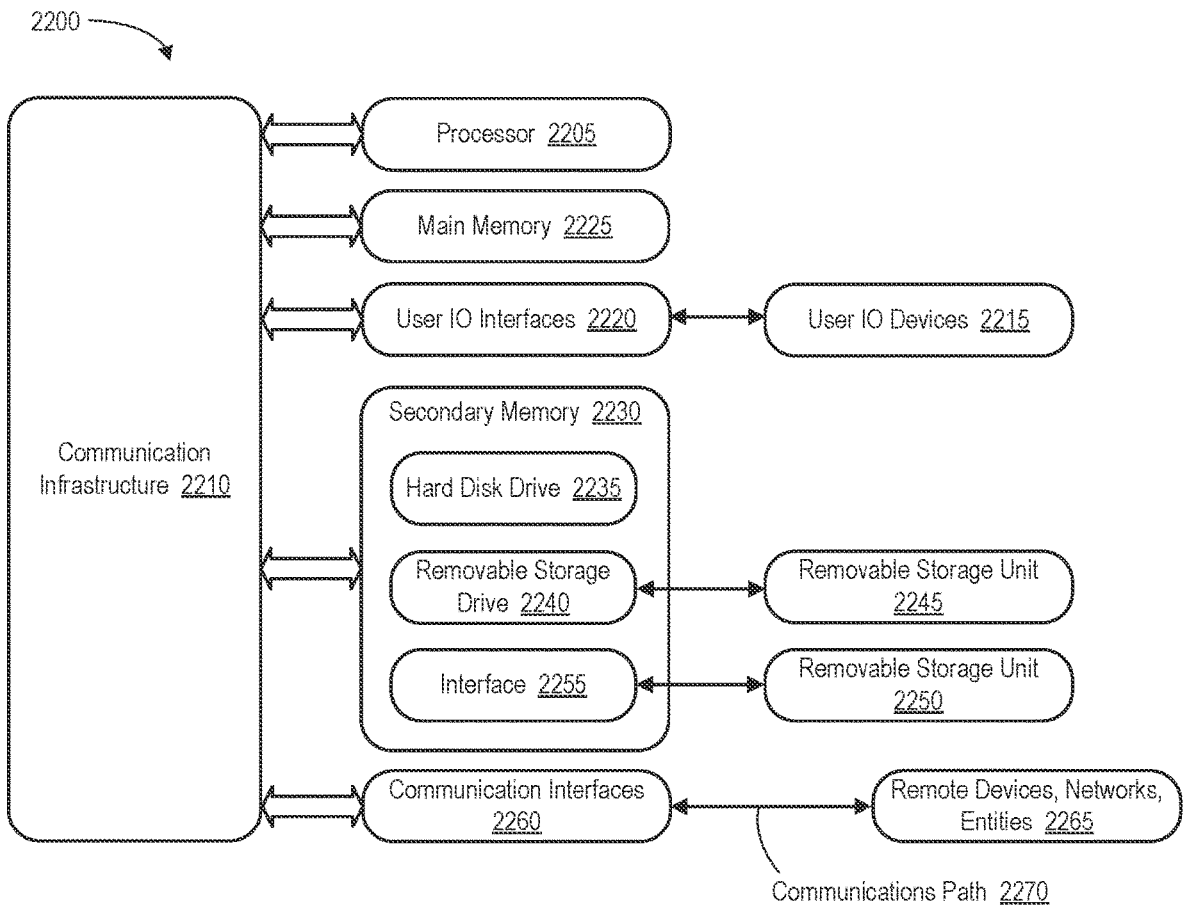
FIG. 22 is a block diagram of an apparatus useful for implementing various aspects disclosed herein, according to some example embodiments.

Various embodiments of a collaboration system and service disclosed herein may be implemented, for example, using one or more computer systems, such as computer system 2200 shown in FIG. 22. The computer system 2200 can be any computer capable of performing the functions described herein. Computer system 2200 includes one or more processors (also called CPUs), such as a processor 2205. Processor 2205 is connected to a communication infrastructure or bus 2210.

One or more processors 2205 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2200 also includes user input/output device(s) 2215, such as monitors, keyboards, pointing devices, etc., that communicate with communication infrastructure xx06 through user input/output interface(s) 2220.

Computer system 2200 also includes a main or primary memory 2225, such as Random-Access Memory ("RAM"). Main memory 2225 may include one or more levels of cache. Main memory 2225 has stored therein control logic (i.e., computer software) and/or data.

Computer system 2200 may also include one or more secondary storage devices or memory 2230. Secondary memory 2230 may include, for example, a hard disk drive 2235 and/or a removable storage device or drive 2240. Removable storage drive 2240 may be a floppy disk drive, a magnetic tape drive, a compact disk drive, an optical storage device, tape backup device, and/or any other storage device/drive.

Removable storage drive 2240 may interact with a removable storage unit 2245. Removable storage unit 2245 includes a computer usable or readable storage device having stored thereon computer software (control logic) and/or data. Removable storage unit 2245 may be a floppy disk, magnetic tape, compact disk, DVD, optical storage disk, and/any other computer data storage device. Removable storage drive 2240 reads from and/or writes to removable storage unit 2245 in a well-known manner.

According to an exemplary embodiment, secondary memory 2230 may include other means, instrumentalities or other approaches for allowing computer programs and/or other instructions and/or data to be accessed by computer system 2200. Such means, instrumentalities or other approaches may include, for example, a removable storage unit 2250 and an interface 2255. Examples of the removable storage unit 2250 and the interface 2255 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2200 may further include a communication or network interface 2260. Communication interface 2260 enables computer system 2200 to communicate and interact with any combination of remote devices, remote networks, remote entities, etc. (individually and collectively referenced by reference number 2265). For example, communication interface 2260 may allow computer system 2200 to communicate with remote devices 2265 over communications path 2270, which may be wired and/or wireless, and which may include any combination of LANs, WANs, the Internet, etc. Control logic and/or data may be transmitted to and from computer system 2200 via communication path 2270.

In an embodiment, a non-transitory tangible apparatus or article of manufacture comprising a tangible computer useable or readable medium having control logic (software) stored thereon is also referred to herein as a computer program product or program storage device. This includes, but is not limited to, computer system 2200, main memory 2225, secondary memory 2230, and removable storage units 2245 and 2250, as well as tangible articles of manufacture embodying any combination of the foregoing. Such control logic, when executed by one or more data processing devices (such as computer system 2200), causes such data processing devices to operate as described herein.

Based on the present disclosure, it will be apparent to persons skilled in the relevant art(s) how to make and use embodiments of the invention using data processing devices, computer systems and/or computer architectures other than that shown in FIG. 22. In particular, embodiments may operate with software, hardware, and/or operating system implementations other than those described herein.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. Embodiments are therefore not limited to any specific combination of hardware and software.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments disclosed herein are solely for the purpose of illustration. Those in the art will recognize other embodiments may be practiced with modifications and alterations to that described above.

What is claimed is:

1. A computer-implemented method, the method comprising:

receiving, via an application programming interface (API) call by an equipment management network, a representation of a data object associated with an equipment in the equipment management network, the data object having an object type and being associated with a first user as an owner of the data object and the equipment management network being enabled to store, mange and share the data object;

receiving, by the equipment management network from the first user, an indication of a specification of whether a first other user of the equipment management network is authorized to reshare the data object via the equipment management network with a second other user of the equipment management network;

receiving, by the equipment management network from the first other user, an indication to reshare the data object with the second other user via the equipment management network;

determining, based on a value of the indication of whether the first other user is authorized to reshare the data object with the second other user via the equipment management network encoded in a defined data field of the data object, that the first other user is authorized to reshare the data object with the second other user via the equipment management network; and automatically resharing, in response to the determining that the first other user is authorized to reshare the data object with the second other user via the equipment management network, the data object with the second other user via the equipment management network without requesting approval from the first user.

2. The method of claim 1, wherein the object type of the data object includes a description of a physical apparatus comprising one or more component parts.

3. The method of claim 1, wherein the data object type of the object includes at least one of metadata, failure modes, other components, and documents associated with the equipment.

4. The method of claim 1, wherein the indication of whether the first other user of the equipment management network is authorized to reshare the data object via the equipment management network with the second other user of the of the equipment management network is distinct from a read right and a write right associated with the data object.

5. The method of claim 1, wherein the indication includes one or more of the data object type, a role of the first other user, and a role of the second other user.

6. The method of claim 5, wherein at least one of the first other user of the equipment management network and the second other user of the equipment management network includes a plurality of users of the equipment management network.

7. The method of claim 6, wherein the first other user of the equipment management network includes a plurality of users of the equipment management network and the indication of whether the first other user of the equipment management network is authorized to reshare the data object via the equipment management network with the second other user of the equipment management network applies to each of a specified group of the plurality of users comprising the first other user, where the users in the specified group each have a first role granting them a right to reshare the data object via the equipment management network with the second other user.

8. The method of claim 1, further comprising:

receiving, from the first user by the equipment management network, an indication to restrict resharing of the data object via the equipment management network with a third other user of the of the equipment management network; and excluding resharing of the data object, based on the indication to restrict resharing received from the first user via the equipment management network, with the third other user by the equipment management network.

9. The method of claim 1, wherein the first user is a manufacturer, the first other user is an operator, and the second other user is a service provider.

10. The method of claim 1, further comprising automatically presenting, via a user interface of the equipment management network in response to the automatic resharing of the data object with the second other user, an indication that the data object is reshared with the second other user.

11. The method of claim 1, further comprising:

receiving, by the equipment management network, a request from the first other user for the data object from the first user, the request including an indication of a read right and a write right associated with the data object and an indication of whether the first other user is authorized to reshare the data object via the equipment management network with the second other user of the equipment management network;

transmitting, by the equipment management network, the request from the first other user for the data object to the first user; and sharing, by the equipment management network based on the request from the first other user for the data object, the data object with the first other user.

19

12. A system comprising:
at least one programmable processor; and
a non-transitory machine-readable medium storing instructions that, when executed by the at least one programmable processor, cause the at least one programmable processor to perform operations comprising:
    receiving, via an application programming interface (API) call by an equipment management network, a representation of a data object associated with an equipment in the equipment management network, the data object having an object type and being associated with a first user as an owner of the data object and the equipment management network being enabled to store, mange and share the data object;
    receiving, by the equipment management network from the first user, an indication of a specification of whether a first other user of the equipment management network is authorized to reshare the data object via the equipment management network with a second other user of the of the equipment management network;
    receiving, by the equipment management network from the first other user, an indication to reshare the data object with the second other user via the equipment management network;
    determining, based on a value of the indication of whether the first other user is authorized to reshare the data object with the second other user via the equipment management network encoded in a defined data field of the data object, that the first other user is authorized to reshare the data object with the second other user via the equipment management network; and
    automatically resharing, in response to the determining that the first other user is authorized to reshare the data object with the second other user via the equipment management network, the data object with the second other user via the equipment management network without requesting approval from the first user.

13. The system of claim 12, wherein the object type of the data object includes a description of a physical apparatus comprising one or more component parts.

14. The system of claim 12, wherein object type of the data object includes at least one of metadata, failure modes, other components, and documents associated with the equipment, the documents including at least one of a structured document and an unstructured document.

15. The system of claim 12, wherein the indication of whether the first other user of the equipment management network is authorized to reshare the data object via the equipment management network with the second other user of the of the equipment management network is distinct from a read right and a write right associated with the data object.

20

16. The system of claim 12, further comprising automatically presenting, via a user interface of the equipment management network in response to the automatic resharing of the object with the second other user, an indication that the data object is reshared with the second other user.

17. A non-transitory, computer readable medium storing instructions, which when executed by at least one processor cause a computer to perform a method comprising:
    receiving, via an application programming interface (API) call by an equipment management network, a representation of a data object associated with an equipment in the equipment management network, the data object having an object type and being associated with a first user as an owner of the data object and the equipment management network being enabled to store, mange and share the data object;
    receiving, by the equipment management network from the first user, an indication of a specification of whether a first other user of the equipment management network is authorized to reshare the data object via the equipment management network with a second other user of the equipment management network;
    receiving, by the equipment management network from the first other user, an indication to reshare the data object with the second other user via the equipment management network;
    determining, based on a value of the indication of whether the first other user is authorized to reshare the data object with the second other user via the equipment management network encoded in a defined data field of the data object, that the first other user is authorized to reshare the data object with the second other user via the equipment management network; and
    automatically resharing, in response to the determining that the first other user is authorized to reshare the data object with the second other user via the equipment management network, the data object with the second other user via the equipment management network without requesting approval from the first user.

18. The medium of claim 17, wherein the object type of the data object includes at least one of a description of a physical apparatus comprising one or more component parts, metadata, failure modes, and documents associated with the equipment.

19. The medium of claim 17, wherein the indication of whether the first other user of the equipment management network is authorized to reshare the data object via the equipment management network with the second other user of the of the equipment management network is distinct from a read right and a write right associated with the data object.

20. The medium of claim 17, further comprising automatically presenting, via a user interface of the equipment management network in response to the automatic resharing of the data object with the second other user, an indication that the data object is reshared with the second other user.

* * * * *